United States Patent [19]

Trechsel

[11] 4,264,266
[45] Apr. 28, 1981

[54] MANIPULATOR APPARATUS

[75] Inventor: Hans W. Trechsel, Rockford, Minn.

[73] Assignee: TL Systems Corporation, Minneapolis, Minn.

[21] Appl. No.: 31,788

[22] Filed: Apr. 20, 1979

[51] Int. Cl.³ .......................................... B23Q 11/04
[52] U.S. Cl. .................................. 414/730; 192/150; 414/590; 414/744 R
[58] Field of Search ............... 414/589, 590, 618, 744, 414/749–751, 730; 192/150, 30 W; 403/330, 327, 2

[56] References Cited

U.S. PATENT DOCUMENTS

| | | | |
|---|---|---|---|
| 3,161,240 | 12/1964 | Horowitz | 192/150 X |
| 3,241,380 | 3/1966 | Howing | 414/744 R X |
| 3,315,051 | 4/1967 | Hasselblad | 192/150 X |
| 3,370,680 | 2/1968 | Bangerter | 192/150 X |
| 3,550,473 | 12/1970 | Bernotus | 192/150 X |
| 4,027,767 | 6/1977 | Gluck | 414/744 R X |
| 4,040,509 | 8/1977 | Missioux | 192/150 |

Primary Examiner—Leslie J. Paperner
Assistant Examiner—Terrance L. Siemens
Attorney, Agent, or Firm—Merchant, Gould, Smith, Edell, Welter & Schmidt

[57] ABSTRACT

A manipulator apparatus (10) for performing a plurality of motions is disclosed. The apparatus (10) includes a rotatable support shaft (14) supported on a frame (12) for rotary motion. A plurality of discrete cams (16–22) are supported in a spaced relationship on the support shaft. An individual coupling mechanism (26–32) couples each of the cams to a motion transmitting device. Each coupling mechanism (26–32) includes a cam follower (146, 280, 333). Individual force limiting mechanisms (158, 404) are provided for each of the coupling mechanisms (26–32) for uncoupling a respective coupling mechanism when a force beyond a predetermined level is reached in the respective coupling mechanism.

52 Claims, 34 Drawing Figures

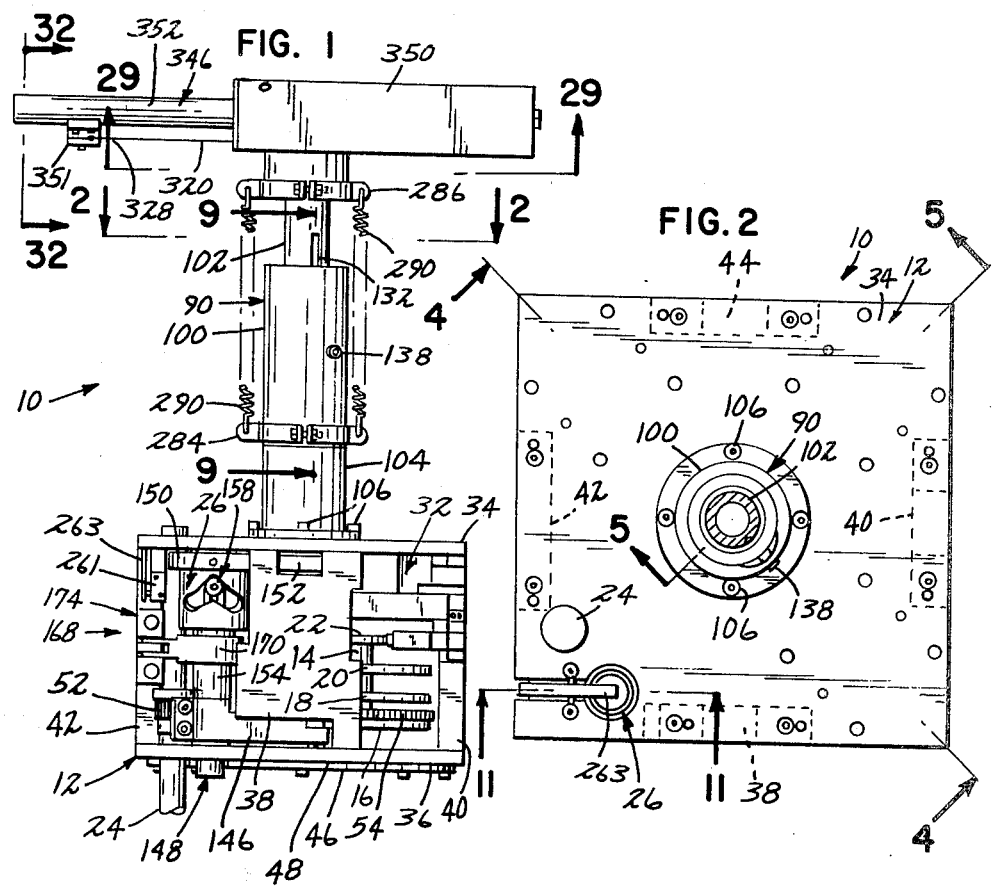
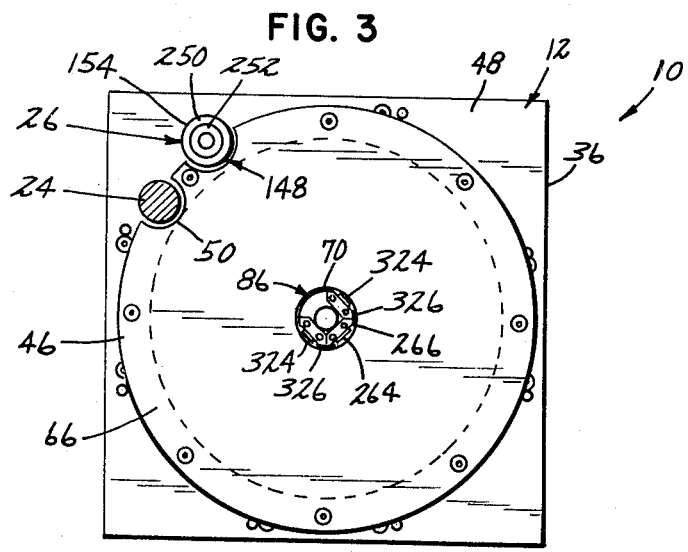

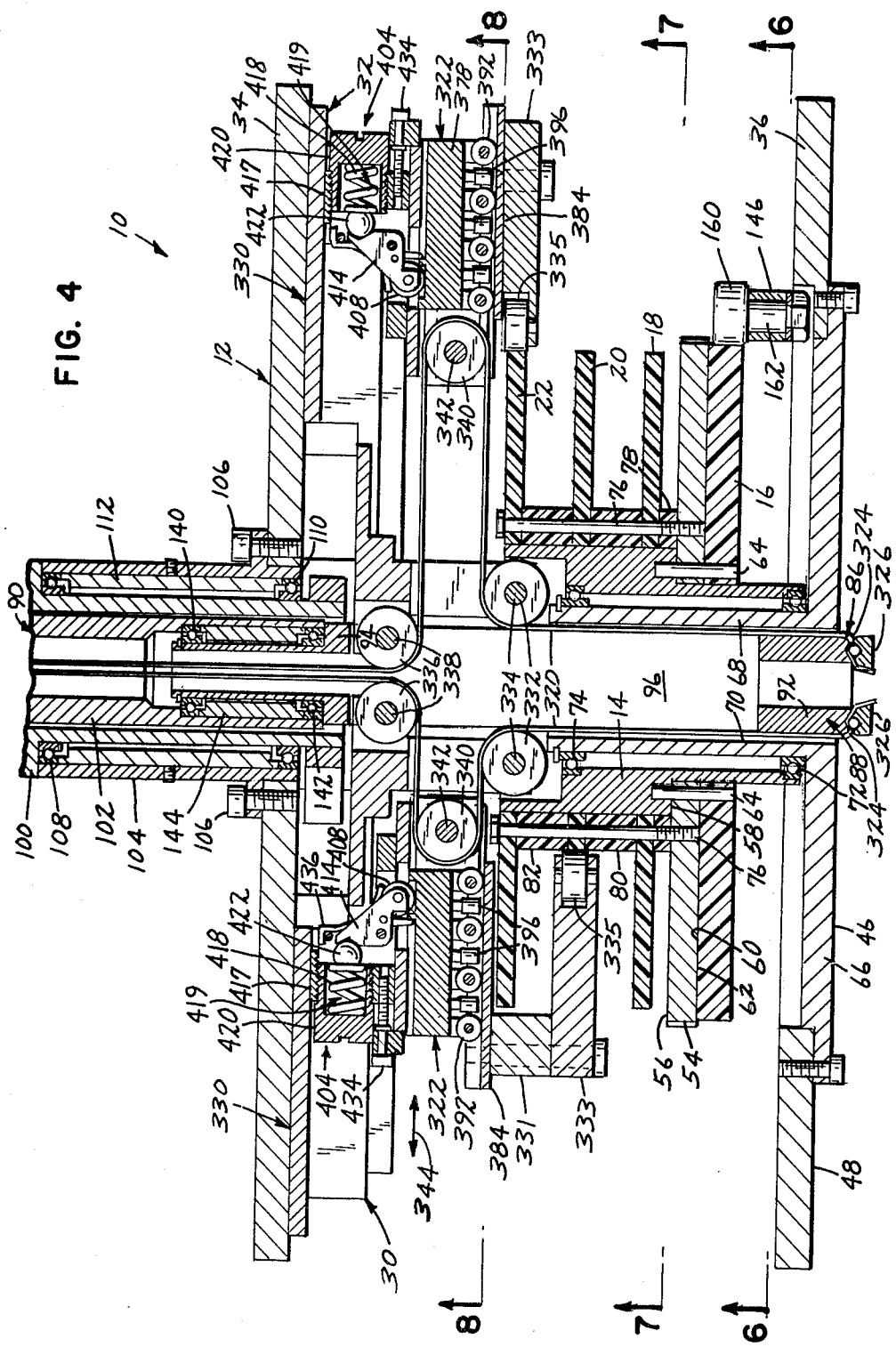

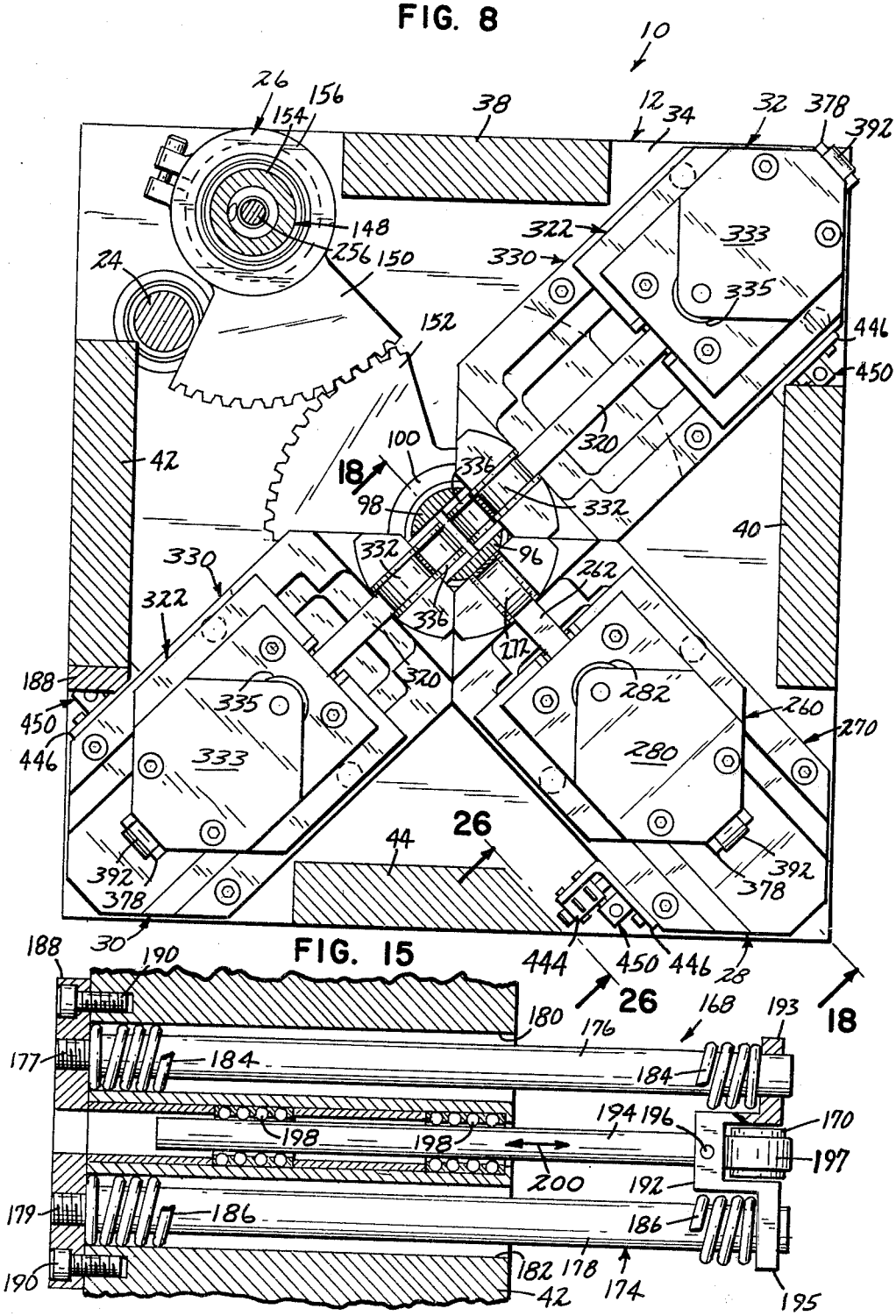

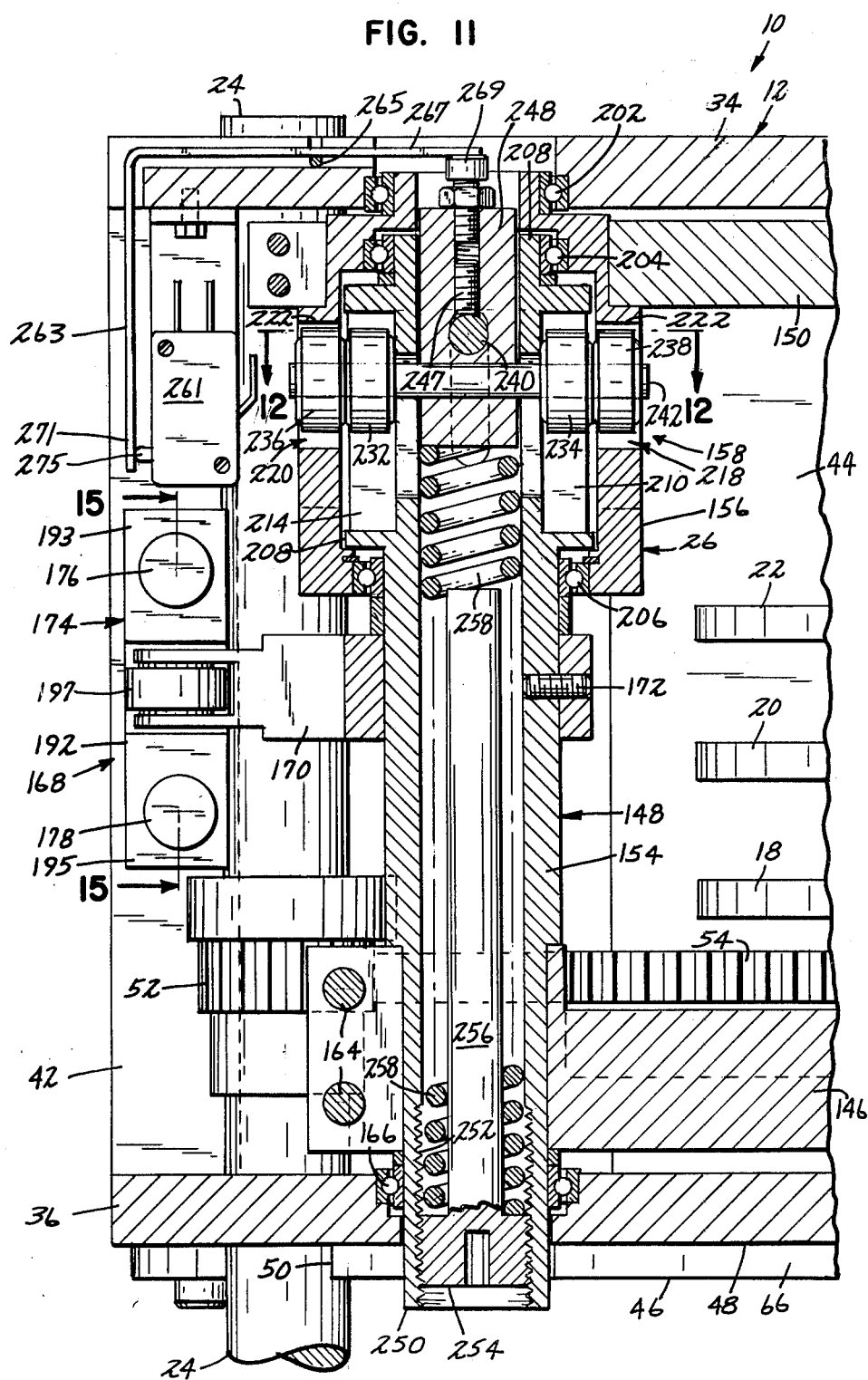

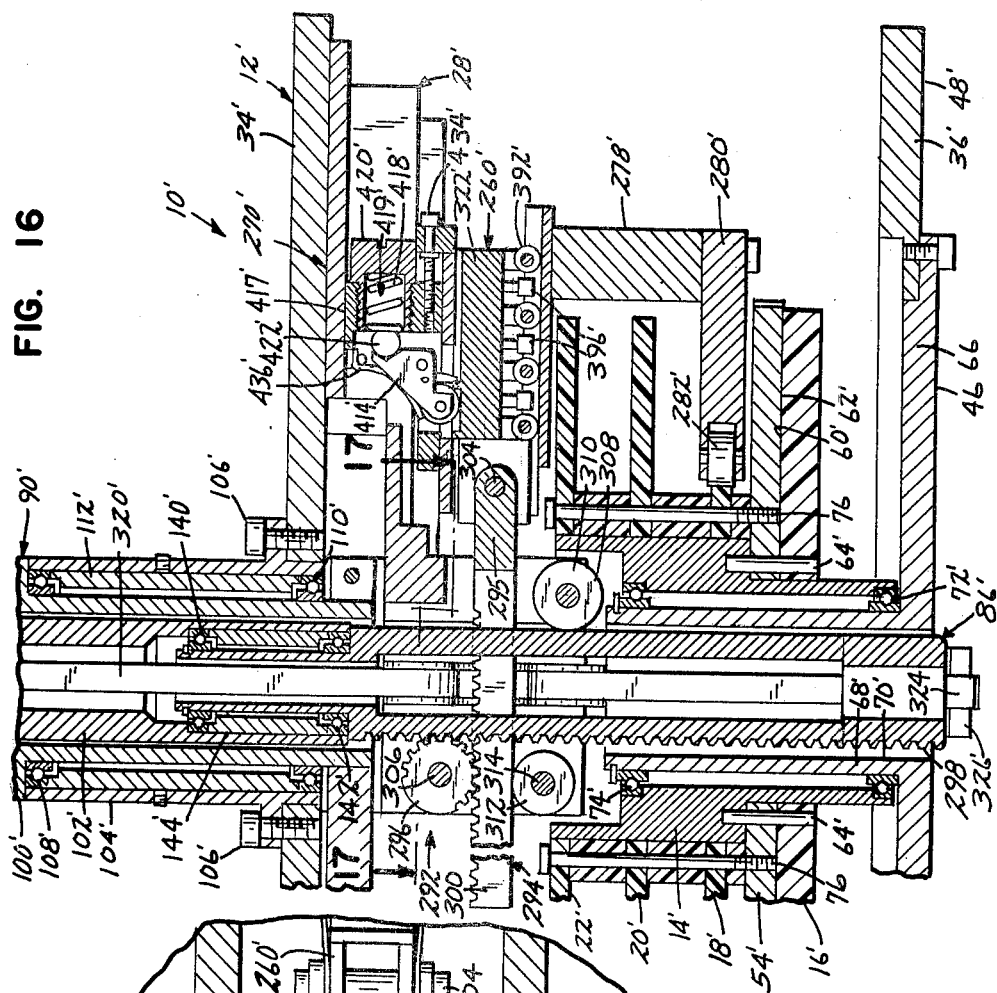
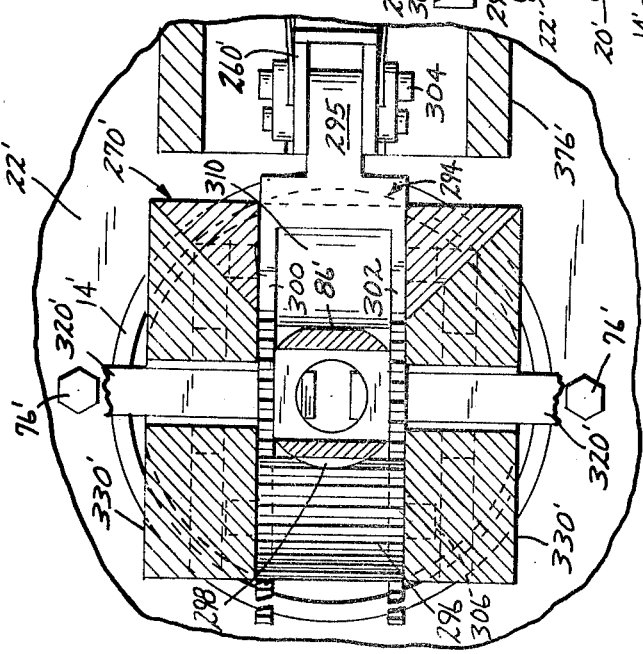
FIG. 16
FIG. 17

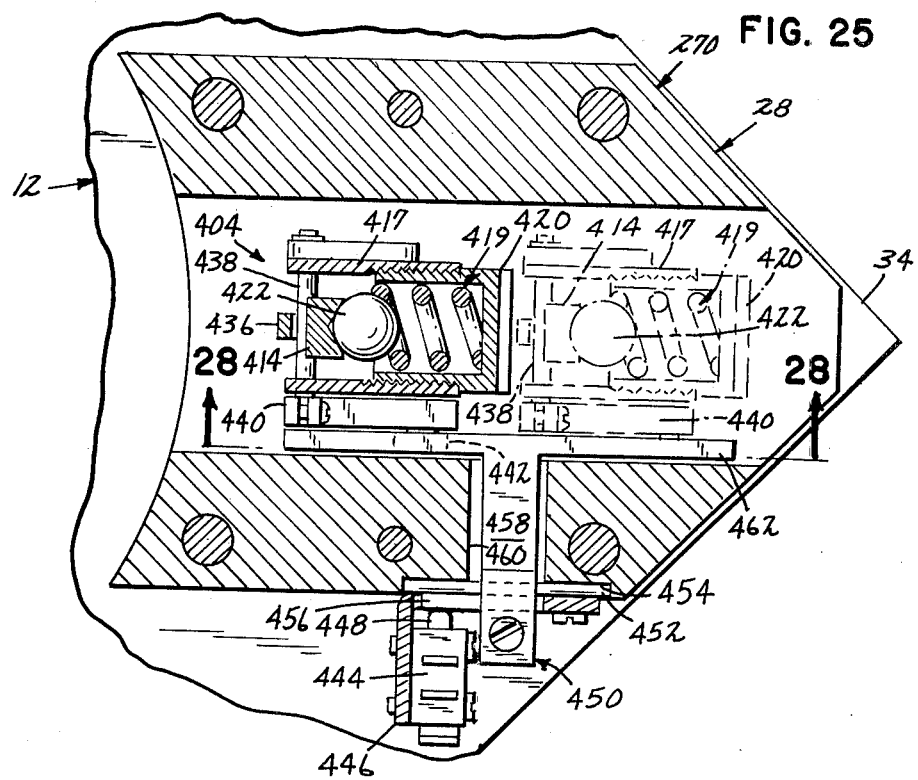
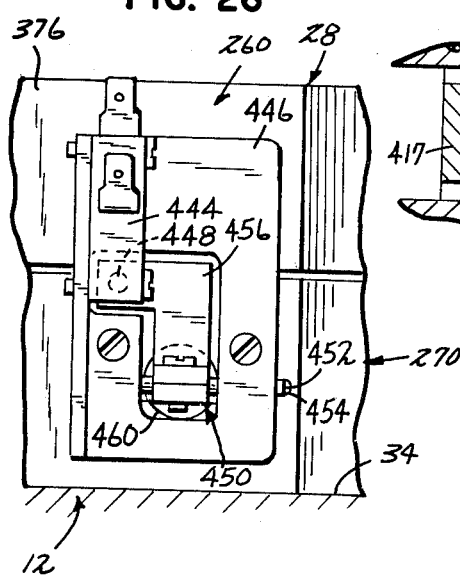
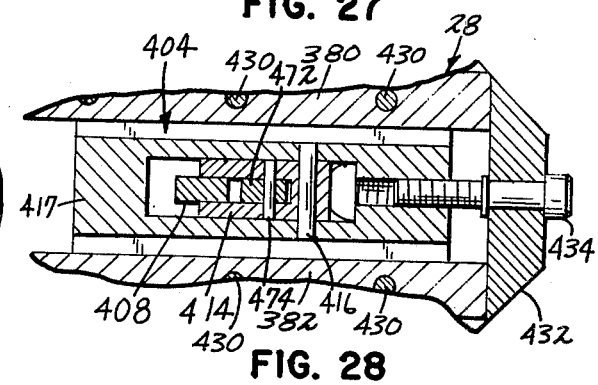
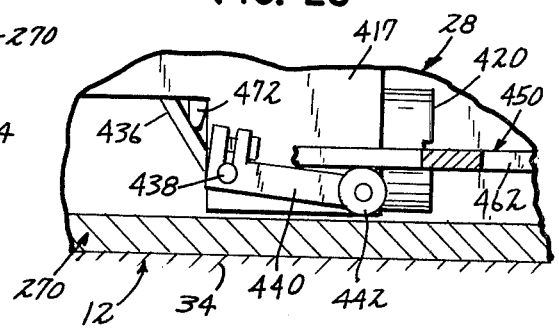

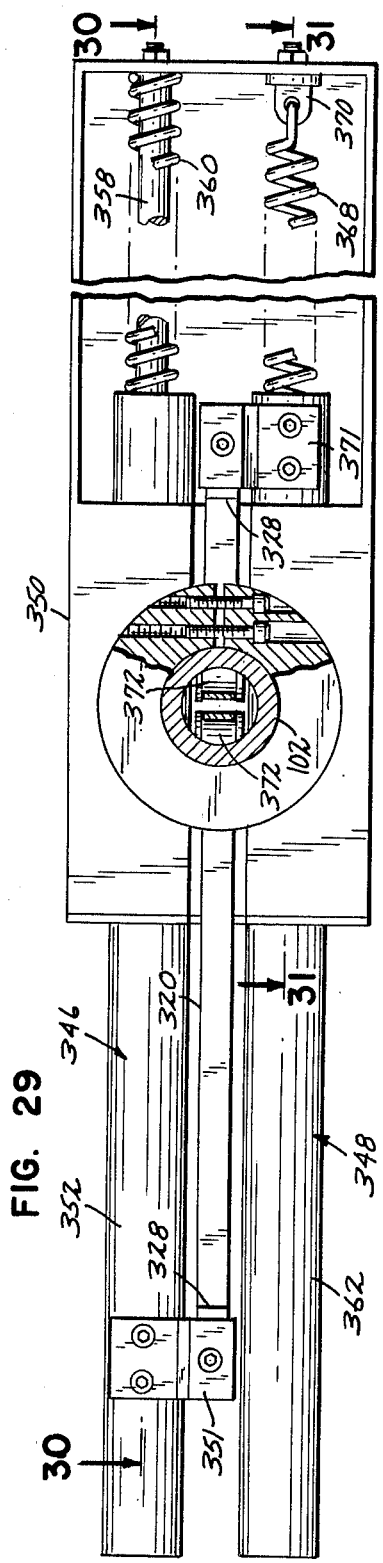
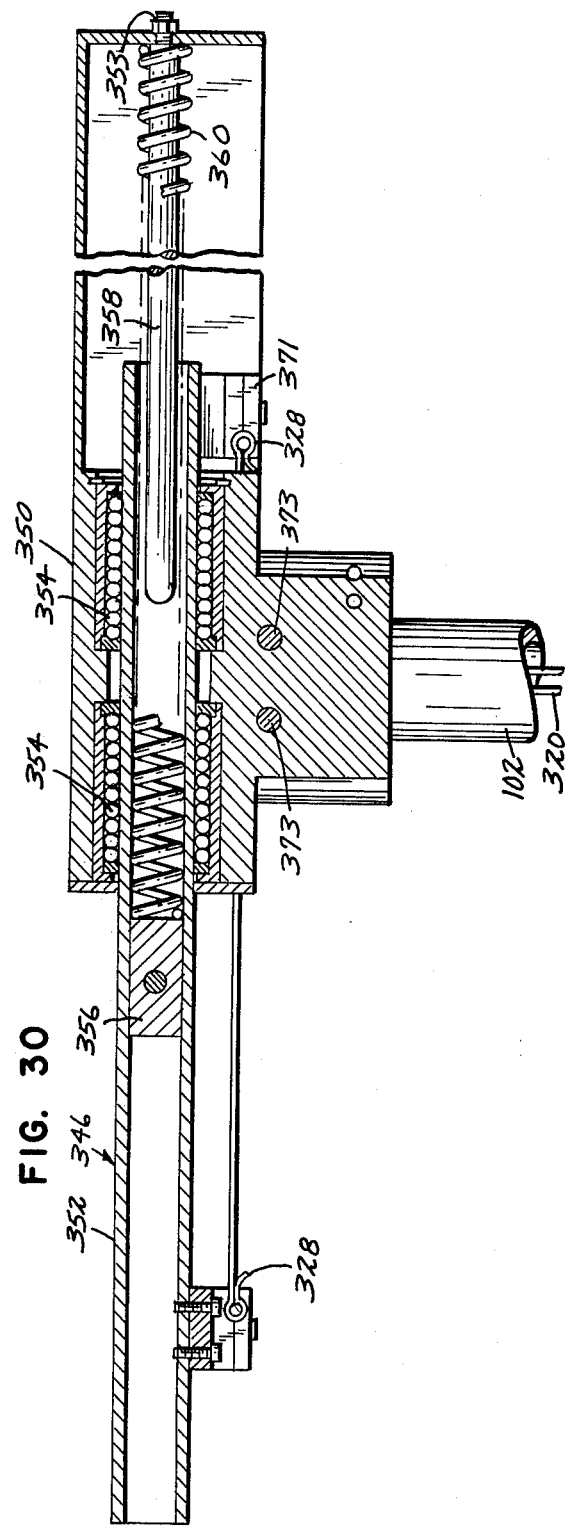
FIG. 29
FIG. 30

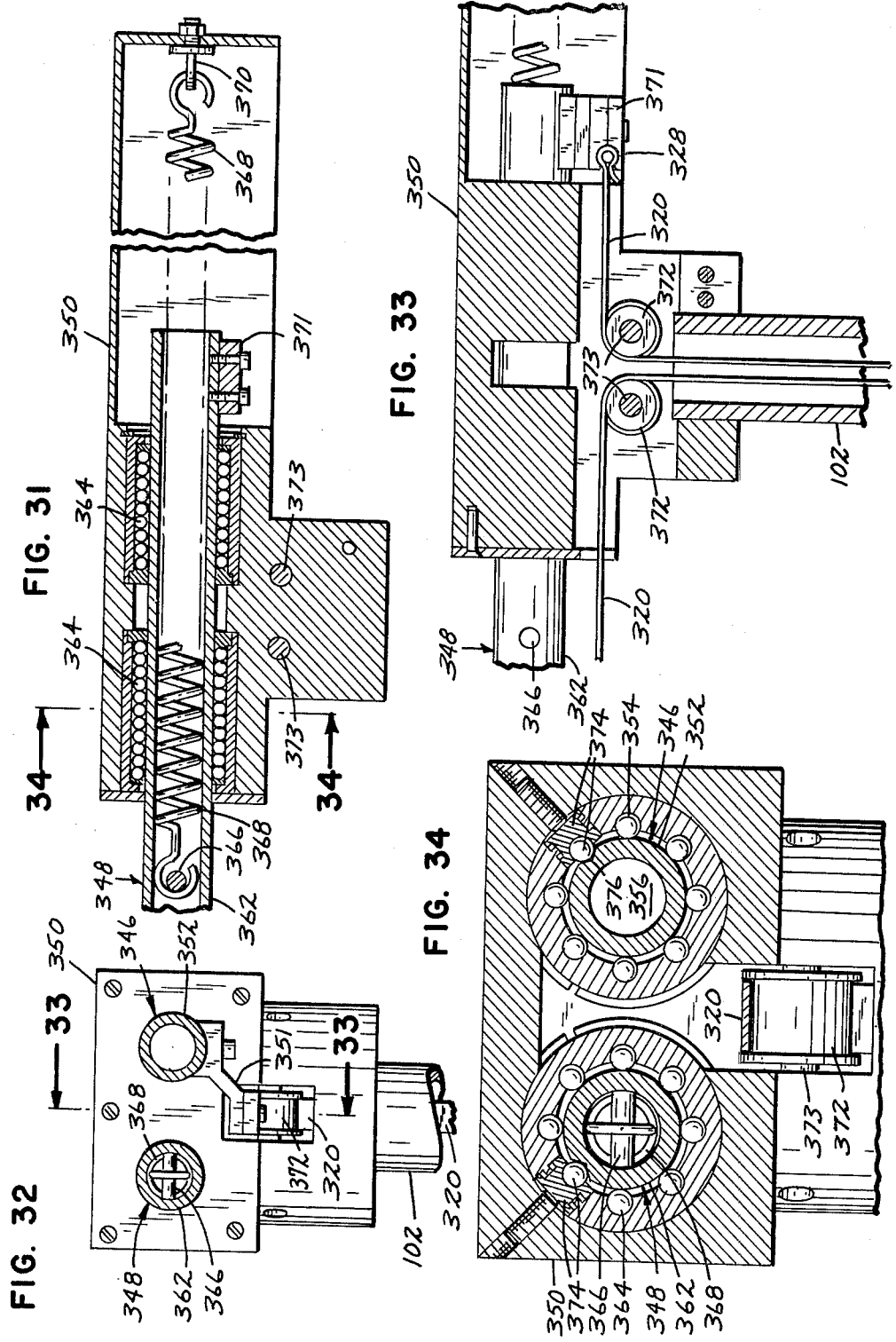

MANIPULATOR APPARATUS

TECHNICAL FIELD

The present invention relates to a manipulator apparatus or robot. The manipulator apparatus is designed to activate or drive a plurality of motion transmitting devices. Rotative, up and down, and in and out motions may be activated by the manipulator apparatus. The motion transmitting devices activated by the manipulator apparatus can be utilized to perform various repetitive motions in an industrial environment. For example, the motion transmitting devices can be used to transfer and/or assemble parts, or to perform welding, cutting, and the like operations.

BACKGROUND OF THE PRIOR ART

Two types of computer controlled manipulators or robots are currently in use. One type of robot utilizes a plurality of digital motors to accomplish a plurality of motions. Another type of computer controlled robot utilizes pneumatically controlled motion transmitting devices.

A robot which utilizes digital motors is limited to current digital motor technology. At present, limits are placed both on the speed and mass which can be handled by such motors. An industrial robot which uses digital motors is produced by ASEA Electronics Division of Sweden and is illustrated in ASEA Pamphlet YB11-101E.

When pneumatic actuating or driving devices are used in computer controlled robots, synchronization of acceleration and deceleration becomes difficult and is a limiting factor. Examples of pneumatically driven robots are illustrated in the following manufacturers' catalogs: Unimotion Inc. Bulletin 600K1-976; Auto-Place Bulletin AP1176-5; Rapid-Line Form #RL-2/4-74; and Wickes Bulletin No. WG-71. In both the pneumatic and electric motor types of robots, high cost computer design is required to program the sequence of motions through which the robot must operate.

SUMMARY OF THE INVENTION

The present invention is directed to a manipulator apparatus for performing a plurality of motions. The apparatus includes a rotatable support shaft supported for rotary motion. A plurality of discrete cams are supported in a spaced relationship on the support shaft. Individual coupling mechanisms couples each of the cams to a motion transmitting device. Each coupling mechanism includes a cam follower for following the profile of one of the cams. Individual force limiting mechanisms are provided for each of the coupling mechanisms for uncoupling a respective coupling mechanism when a force beyond a predetermined level is reached in the respective coupling mechanism.

In a preferred embodiment, a support tube is movably carried within a hollow interior of the support shaft. The support tube is used to support one or more motion transmitting devices. Also, the support tube can form a portion of a motion transmitting device in and of itself. The support tube can be used to transmit inward and outward motion relative to the cams. In one embodiment, one of the coupling mechanisms includes a flexible tape which is attached at one end to the support tube and at its other end at a fixed location. A slide assembly which is movable in a direction generally transverse to the axis of the support tube is provided for varying the effective distance between the first and second ends of the tape. This is accomplished by passing a portion of the tape around a roller on the slide assembly. By moving the slide assembly radially inwardly and outwardly, the effective or straight line distance between the first and second ends is changed and the support tube is moved inwardly and outwardly, or upwardly and downwardly when the apparatus is supported horizontally. In another environment a rack and pinion mechanism can be coupled to the slide assembly in place of the tape. In this embodiment, a first rack is connected to the slide assembly and a second rack is connected to the support tube. A pinion meshes with both the first and second racks to transfer the inward and outward motion of the slide to the upward and downward motion of the support tube.

An upper rotatable portion of the support tube can also form a portion of a motion transmitting device. This device is utilized to rotate the motion transmission devices carried by the support tube. Another one of the coupling mechanisms serves as a rotary motion coupling mechanism for causing the rotation of the upper portion of the support tube. The rotary motion coupling mechanism includes a first gear sector attached to a rotatable rod member and a second gear sector attached to the support tube. The first and second gear sectors mesh with one another. A lower end of the rod member carries a follower arm which is placed in contact with one of the cams. The motion of the cam follower arm in response to the profile of the cam is transferred through the rod member and the sector gears as rotation of the upper portion of the support tube. The rotatable rod member is made into sections which are separable from one another in order to form a force limiting means should excessive force be presented to the gear sectors.

In the preferred embodiment, additional slide assemblies and tape mechanisms couple additional discrete cams to other motion transmitting devices. Each additional tape has a first end connected to the support tube and a second end connected to a motion transmitting device. The motion of a slide assembly changes the effective length or straight line discrete between the first and second ends of one of the tapes to thereby actuate the motion transmitting device attached thereto. In the preferred embodiment, linear motion arms are supported on the support tube as the additional motion transmitting devices.

Each of the slide assemblies is preferably made of first and second slides which are movable relative to one another. A connecting mechanism is provided for connecting the first and second slides for motion together as a unit and for releasing the first and second slides from one another when excessive force is placed upon an associated tape. The amount of force required to uncouple the connecting mechanism can be varied depending upon the operations to be performed by the motion transmitting devices. Thus, if very fragile and sensitive articles are to be handled, the connecting mechanism can be set up to uncouple the first and second slides in response to a relatively low force.

The present invention thus is capable of accomplishing a plurality of repetitive and interconnected motions in a rapid and completely mechanical manner. Complex computer programming, separate digital electrical motors or pneumatic circuits are not required. Since a purely mechanical system is utilized, fast motions at relatively high levels of force can be accomplished.

Furthermore, since fast motions can be accomplished by utilizing the present invention, safety mechanisms are incorporated to disengage the manipulator apparatus from the motion transmitting device or devices should problems such as jamming or overload occur. While in the embodiment disclosed, a specified number of cams and motion transmitting devices are disclosed, it should be understood that additional cams can be utilized if additional motions are required. The motion transmitting devices are activated independent of one another.

Various advantages and features of novelty which characterize the invention are pointed out with particularity in the claims annexed hereto and forming a part hereof. However, for a better understanding of the invention, its advantages, and objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

FIG. 1 is an elevational view of a manipulator apparatus in accordance with the present invention;

FIG. 2 is a sectional view taken generally along line 2—2 of FIG. 1;

FIG. 3 is a bottom plan view of the manipulator apparatus;

FIG. 4 is a sectional view taken generally along line 4—4 of FIG. 2;

FIG. 8 is a sectional view taken generally along line 8—8 of FIG. 4;

FIG. 11 is a sectional view taken generally along line 11—11 of FIG. 2;

FIG. 15 is a sectional view taken generally along line 15—15 of FIG. 11;

FIG. 16 is a sectional view similar to FIG. 5 illustrating an alternate embodiment of a coupling mechanism for raising and lowering a support tube;

FIG. 17 is a sectional view taken generally along line 17—17 of FIG. 16;

FIG. 25 is a sectional view taken generally along line 25—25 of FIG. 18;

FIG. 26 is a view taken generally along line 26—26 of FIG. 8;

FIG. 27 is a sectional view taken generally along line 27—27 of FIG. 18;

FIG. 28 is a sectional view taken generally along line 28—28 of FIG. 25;

FIG. 29 is a view taken generally along line 29—29 of FIG. 1;

FIG. 30 is a sectional view taken generally along line 30—30 of FIG. 29;

FIG. 31 is a sectional view taken generally along line 31—31 of FIG. 29;

FIG. 32 is a view taken generally along line 32—32 of FIG. 1;

FIG. 33 is a sectional view taken generally along line 33—33 of FIG. 32; and

FIG. 34 is a view taken generally along line 34—34 of FIG. 31.

DETAILED DESCRIPTION OF THE INVENTION

Figure 5:
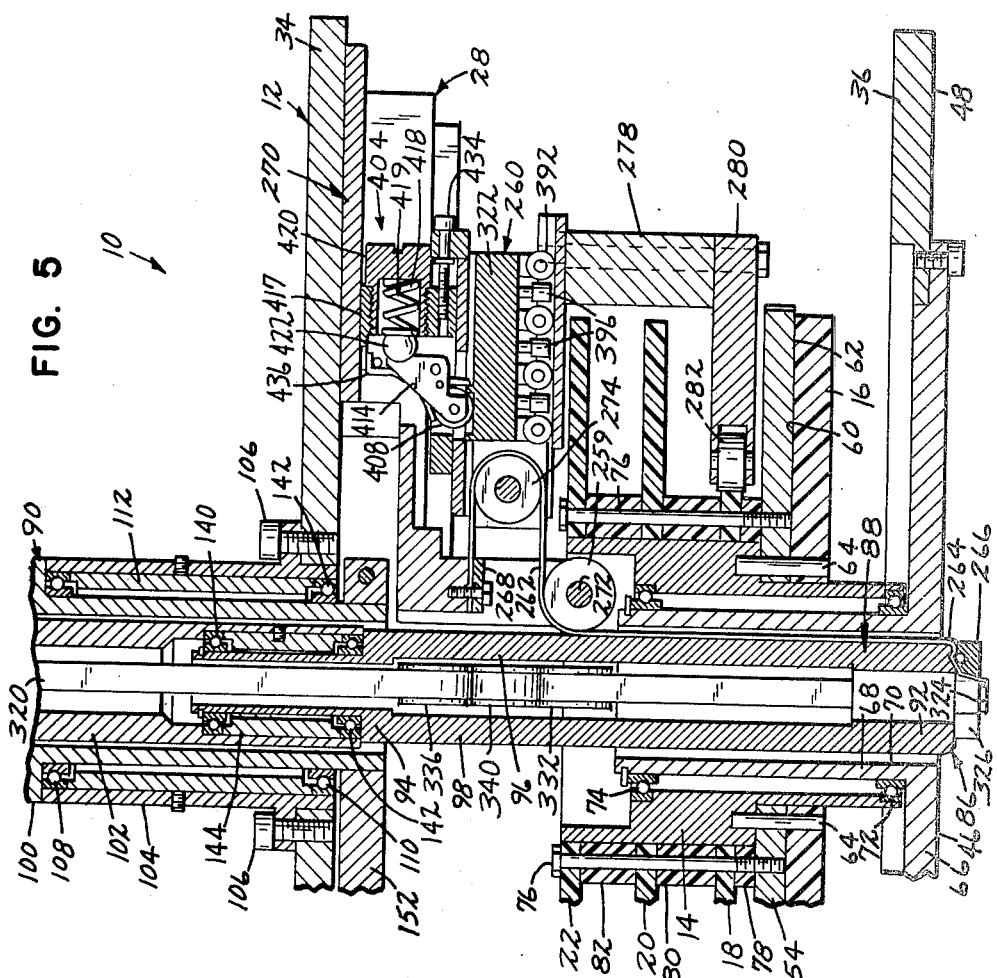
FIG. 5 is a sectional view taken generally along line 5—5 of FIG. 2.

Referring to the drawings in detail, wherein like numerals indicate like elements, there is shown in FIG. 1 a manipulator apparatus designated generally as 10. The apparatus 10 includes a frame 12 upon which a support shaft 14 is rotatably supported. A plurality of cams 16, 18, 20 and 22 are removably supported on the support shaft 14. See FIG. 4. A single rotary input drive shaft 24 provides the driving force to rotate the support shaft 14 and the cams 16-22. As seen best in FIGS. 4, 5 and 6 a plurality of coupling means, designated generally as 26, 28, 30 and 32, each operatively connected to one of the cams 16-22. Each coupling means 26-32 couples an associated cam 16-22 to a motion transmitting device, as will be explained more fully hereinafter. Coupling means 26 is used to transfer the rotary motion of cam 16 into rotary motion. Coupling means 28 is used to transfer the rotary motion of cam 18 into inward and outward motion transverse to a major face of the cam plates 16-22. Coupling means 30-32 are used to transfer the rotary motion of cams 20-22 into other motions of motion transmitting devices. Such motions could be inward and outward movement of arms, rotary motion of clamping members, clamping motions of clamping members, or other repetitive mechanical motions.

The frame 12 includes a generally rectangular top member 34, a generally rectangular bottom member 36 and a plurality of upright members 38, 40, 42 and 44. Each upright member 38-44 is connected between the top member 34 and the bottom member 36 along one of their sides. A generally circular base plate 46 is attached to a bottom surface 48 of the base member 36. The input drive shaft 24 passes through a hole in the bottom member 36 and by a cut-out 50 in the circumference of the base plate 46. A drive gear 52 is attached to a portion of the drive shaft 24 within the confines of the frame 12. An annular shaped driven gear 54 is attached to the support shaft 14 and has teeth along its outer perimeter which mesh with the teeth of the drive gear 52.

The driven gear 54 has a central hole and is received about a lower end of the support shaft 14. An upper surface 56 of the driven gear 54 contacts a radially outwardly extending ledge 58 of the support shaft 14. An upper surface 60 of the cam 16 contacts a lower surface 62 of the driven gear 54. A plurality of aligned holes are formed through the cam 16 and the driven gear 54. Fasteners and pins 64 pass through the holes in the cam 16 and the driven gear 54 and are thereafter fastened in the ledge 58 of the support shaft 14. The cam 16 and the driven gear 54 are thus fixed to the support shaft 14.

The base plate 46 has a ring-shaped outer section 66 and a cylindrical section 68 extending from the center thereof. A generally circular hole 70 extends through the center of the ring-shaped section 66 and the cylindrical section 68. The support shaft 14 is supported about the outer surface of cylindrical section 68 for rotary motion thereto by means of lower bearing members 72 and upper bearing members 74.

Figure 7:
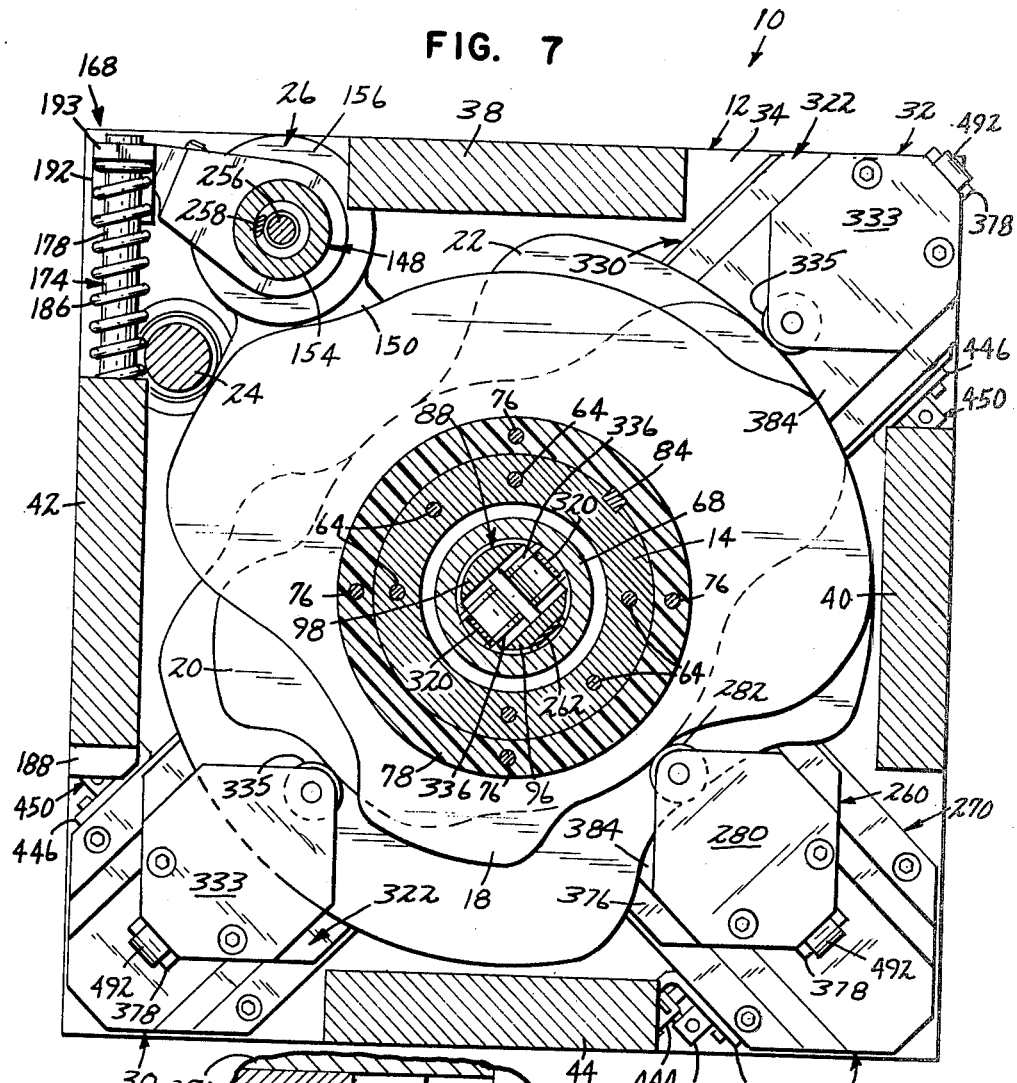
FIG. 7 is a sectional view taken generally along line 7—7 of FIG. 4.

The cams 18, 20, 22 are supported in a spaced relationship above the driven gear 54 by a plurality of bolts 76 and spacers 78, 80 and 82. The spacer 78 is placed between the driven gear 54 and the cam 18. The spacer 80 is placed between the cam 18 and the cam 20. The spacer 82 is placed between the cam 20 and cam 22. The bolts 76 pass through holes in the cams 18, 20, 22 and the spacers 78, 80 and 82 and are secured to the driven gear 54. As seen in FIG. 7, a key 84 extends radially outward from the support shaft 14. The key 84 aligns the cams 18, 20 and 22 in a proper rotative position. All of the cams 16–22 are thus connected to the support shaft 14 and the driven gear 54 for unitary rotation. Rotary motion is provided to the support shaft 14 and the cams 16–22 attached thereto by means of the drive shaft 24 and the drive gear 52 attached thereto.

A support tube 86 is movably carried in the hole 70 of the support shaft 14 and extends generally outwardly or upwardly therefrom. The support tube 86 has a lower nonrotatable section 88 and an upper rotatable section 90. The entire support tube 86 is movable inward and outward in a direction transverse to the major face of the cams 16–22. When the frame 12 is held generally horizontally as shown in FIG. 4, the support tube 86 is movable upwardly and downwardly. The operation of the apparatus 10 will be described with the frame in such a horizontal disposition, however, it should be understood that the frame 12 may be disposed at angles other than horizontal.

The lower non-rotatable section 88 includes a lower cylindrical portion 92, an upper cylindrical portion 94 and a pair of opposed and spaced intermediate portions 96, 98 connected between the lower and upper portions 92, 94. The upper rotatable section 90 includes an outer portion 100 and an inner portion 102. In a manner to be explained more fully hereinafter, the inner and outer portions 100, 102 are rotatable together as a unit, while the outer portion 100 is affixed in a single horizontal disposition and the inner portion 102 is movable upwardly and downwardly relative thereto.

Figure 9:
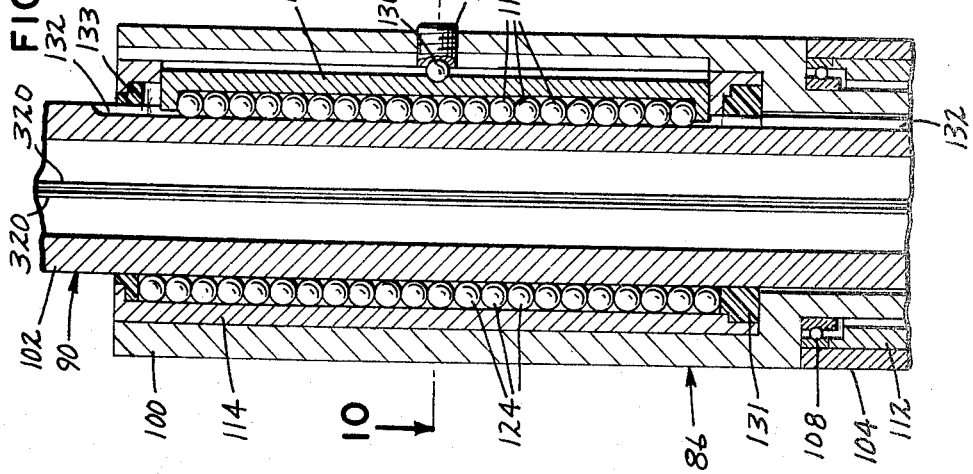
FIG. 9 is a sectional view taken generally along line 9—9 of FIG. 1.
Figure 10:
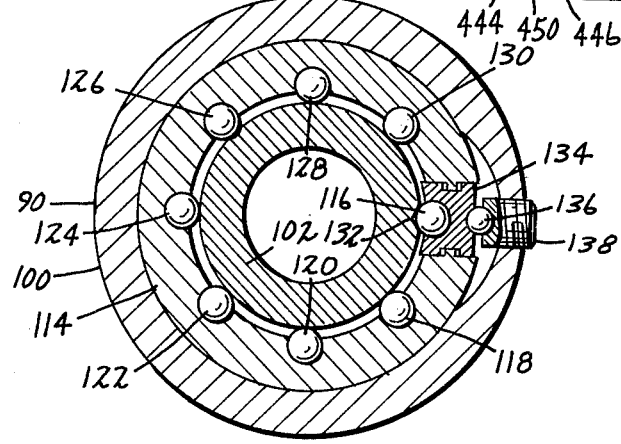
FIG. 10 is a sectional view taken generally along line 10—10 of FIG. 9.

A cylindrical support member 104 is attached to a top surface of the top member 34 by a plurality of bolts 106. An upper circular bearing 108 and a lower circular bearing 110 are supported about the outer portion 100 by the cylindrical support member 104 and a spacer 112. As seen in FIGS. 9 and 10 a spacer 114 is supported between the outer and inner portions 100, 102 at a level above the support member 104. A plurality of linear ball bearing members 116, 118, 120, 122, 124, 126, 128 and 130 are supported between the spacer 114 and the inner portion 102. The lower seal 131 is inserted between spacer 114 and inner portion 102 below the linear ball bearing members 116–130 and an upper seal 133 is inserted between the spacer 114 and the inner portion 102 above the linear ball bearing members 116–130. Relative linear motion of the lower non-rotatable section 88 and the inner portion 102 of the upper rotatable section 90 along the axis of the support tube 86 is thus permitted between the inner and outer portions 102, 100 by the linear ball bearing members 116–130.

A key slot 132 is formed in the outer surface of the inner portion 102. See FIGS. 9 and 10. The ball bearing member 116 is disposed slightly radially inward of the other ball bearing members 118–130 and is thus received within the key slot 132. The keying of the ball bearing member 116 to the key slot 132 transfers any rotary motion of the outer portion 100 to the inner portion 102. A certain amount of play is permitted in the ball bearing member 116 by mounting it in a separate spacer 134 which is permitted to move a small amount. A slight amount of pivoting of the spacer 134 and the ball bearing member 116 is permitted about the ball 136 which is held against the spacer 134 by a set screw 138.

In order to permit the outer and inner portions 100, 102 of the upper rotatable section 90 to rotate without transmitting rotary motion to the lower non-rotatable section 88, circular bearing members 140, 142 and a spacer 144 are held between the upper cylindrical portion 94 of the lower non-rotatable section 88 and a lower end of the inner portion 102 of the upper rotatable section 90. The lower non-rotatable section 88 can thus be moved upwardly and downwardly together with the inner portion 102 of the upper rotatable section 90 by means of the linear bearing members 116–130. At the same time, the inner portion 102 is free to rotate relative to the lower non-rotatable section 88 by means of the circular bearings members 140, 142.

The coupling means 26 is best seen in FIGS. 6–8 and FIGS. 11–15. As was discussed above, the coupling means 26 couples the cam 16 to a rotary motion transmitting means. In the preferred embodiment, the rotary motion transmitting means or device is formed in part by the upper rotatable section 90 of the support tube 86. As will be discussed hereinafter, the support tube 86 supports additional motion transmitting means or devices.

The coupling means 26 includes a cam follower arm 146, a rotatable rod member 148, a first gear sector 150, and a second gear sector 152. The rotatable rod member includes a lower portion 154 to which the cam follower arm 146 is secured and an upper portion 156 to which the first gear sector is secured. A force limiting means designated generally as 158 interconnects the lower and upper portions 154, 156 so that the two portions rotate in unison, assuming excessive force is not presented to the rotatable rod member 148. The second gear sector 152 is attached to the outer portion 100 of the upper rotatable section 90 of the support tube 86 for rotation therewith. The first gear sector 150 meshes with the second gear sector 152. In this manner, the pivoting motion of the cam follower arm 146 which is caused by the rotary motion of the cam 16 is transferred as rotary motion of the upper portion 100 through the rotatable rod member 148 and the first and second gear sectors 150, 152.

A roller 160 is rotatably carried on a support pin 162 at the distal end of the cam follower arm 146. The other end of the cam follower arm 146 is comprised of a clamp which can be tightened down upon the lower portion 154 of the rod member 148 by screws or bolts 164. The lower end of the lower portion 154 is rotatably supported in the bottom member 36 by a circular bearing member 166.

Figure 6:
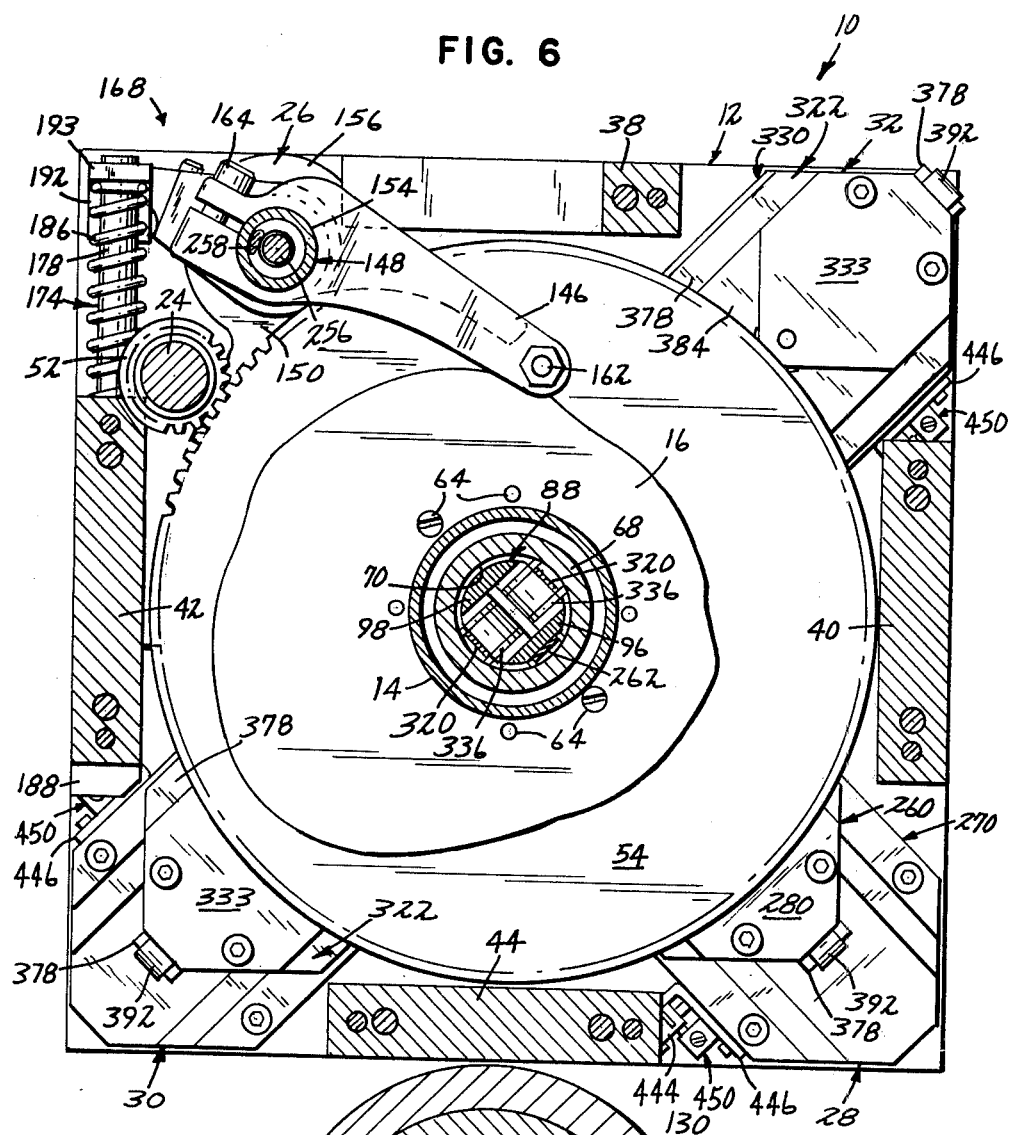
FIG. 6 is a sectional view taken generally along line 6—6 of FIG. 4.

A biasing means, designated generally as 168 in FIGS. 11 and 15, provides a rotary bias to the lower portion 154 in order to keep the cam follower arm 146 and its roller 160 biased against the profile of the cam 16. The biasing means 168 includes a crank arm 170 which is fixed to the lower portion 154 for rotation therewith by means of a set screw 172. The set screw 172 screws down into a hole in the lower portion 154. A rotative bias is provided to the crank arm 170 in a clockwise dimension as seen in FIG. 6 by a spring biasing device designated generally as 174 in FIG. 15.

The device 174 includes a pair of spring support rods 176, 178 which are supported in bores 180, 182 respectively in the upright member 42. An end plate 188 is attached to an end of the upright member 42 by screws 190. The rods 176, 178 have threaded ends 177, 179, respectively which thread into threaded holes in the end plate 188. A spring 184 is carried about the support rod 176 and a spring 186 is carried about the support rod 178. A saddle 192 has a pair of legs 193, 195 each of which is journalled about one of the support rods 176, 178. A first end of each spring 184, 186 is placed in contact with the end plate 188 and a second end of each spring 184, 186 contacts the saddle 192 to bias it outwardly. The saddle 192 is also fixedly connected to a saddle guide rod 194 by connecting pin 196. Linear ball bearing members 198 are supported in a hole through the upright member 42. The saddle guide rod 194 is carried for reciprocal motion as indicated by arrows 200 within the ball bearing members 198. The saddle 192 has rolling engagement with the crank arm 170 by means of roller 197 carried by the crank arm 170. The springs 184, 186 thus bias the saddle guide rod 194 to the right in FIG. 15, or upwardly in FIG. 6 to thereby provide the counterclockwise bias to the cam follower arm 146 as viewed in FIG. 6.

An upper end of the upper portion 156 of the rotatable rod member 148 is rotatably journaled with respect to the top member 34 by a circular bearing member 202. The upper and lower portions 156, 154 of the rod member 148 are rotatable relative to one another by means of circular bearing members 204, 206. In a manner explained more fully hereinafter, when the force to rotate the gear sector 150 is not excessive, the force limiting means 158 keeps the upper and lower portions 154, 156 from rotating relative to one another about the bearing members 204, 206 and the upper and lower portions 154, 156 rotate in unison about the bearing members 166, 202.

The upper portion 156 of the rod member 148 has a hollow interior and a generally stepped configuration wherein the transverse dimension of the upper portion 156 decreases in a plurality of discrete steps. The lower portion 154 has an upper end 208 which is received within the hollow interior of the upper portion 156. The upper end 208 has a dimension transverse to the axis of the rod member 146 and which extends radially outward a greater distance than the section of the lower portion 154 below the upper end 208. A plurality of slots 210, 212, 214 and 216 are formed in the outer circumference of the upper end 208 and run in a generally axial or up and down direction. A camming slot 218 is formed in one circumferential side of the upper portion 156 and a second camming slot 220 is formed in the other circumferential side of the upper portion 156. Each camming slot 218, 220 has a circumferential extent of approximately 135°. Each camming slot 218, 220 has an upper detent area 22 and a downwardly camming surface 224, 226 on either side of the detent area 222. The upper end 208 is received within the hollow interior of the upper portion 156 such that each detent area 222 is aligned with one of the slots 210–216 under normal operating conditions.

A pair of rollers 228, 230 are supported on a first pin 240. Rollers 232, 234, 236 and 238 are carried on a second pin 242. The first and second pins 240, 242 are supported within a carrier member 248 and extend generally perpendicular to one another. The rollers 228–234 form a first set of rollers each of which is received within one of the slots 210–216 formed in the upper end 208. The rollers 236, 238 form a second set of rollers each of which is received within one of the camming slots 218, 220 in the upper portion 156.

Figure 12:
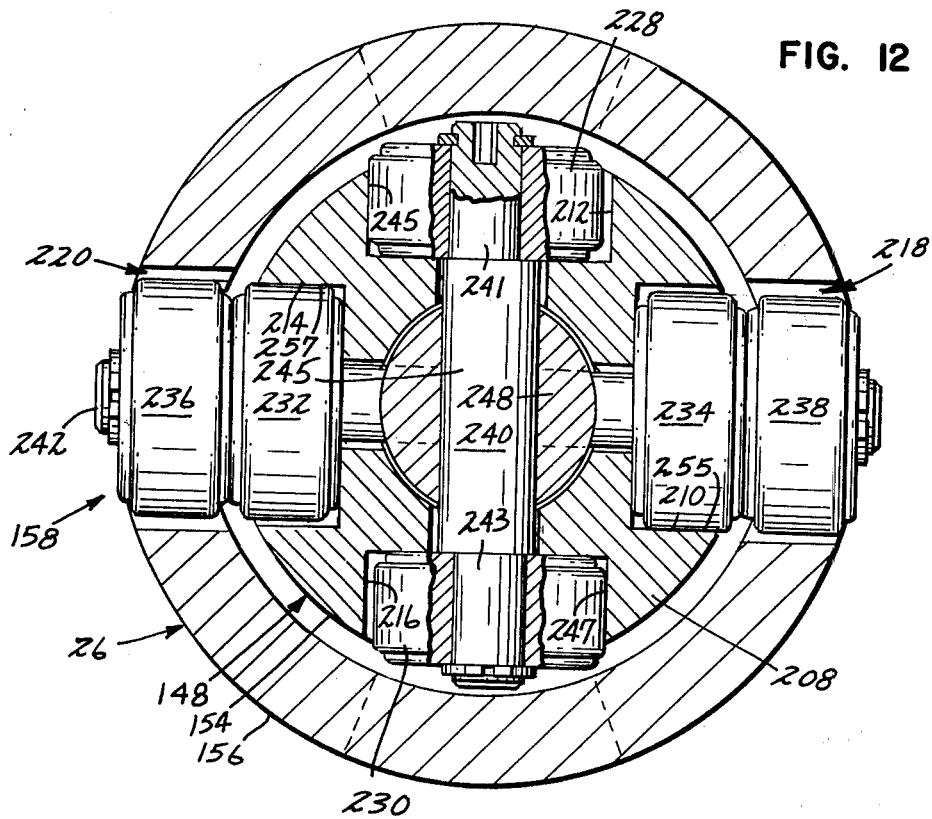
FIG. 12 is a sectional view taken generally along line 12—12 of FIG. 11.
Figure 13:
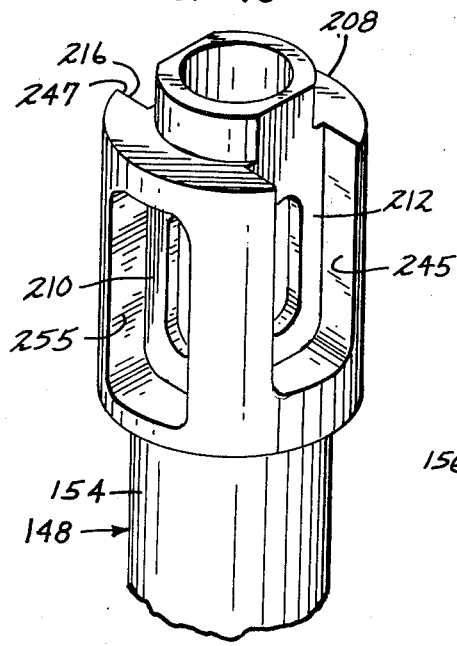
FIG. 13 is a perspective view of a portion of a force limiting mechanism.
Figure 14:
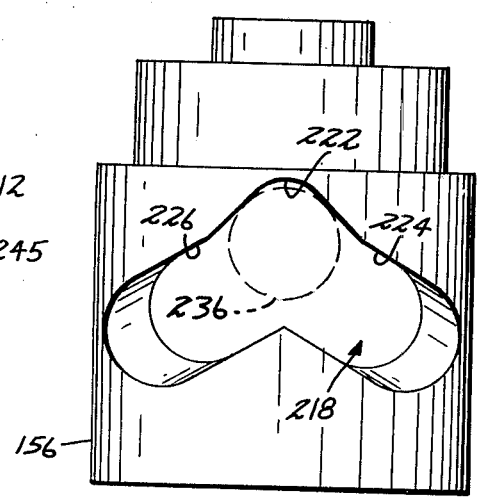
FIG. 14 is an elevational view of a portion of a force limiting mechanism.

The rollers 228 and 230 are each rotatably supported on an eccentrically disposed axle portions 241, 243 of the pin 240. That is, each axle portion 241, 243 is eccentrically disposed with respect to the axis of the central portion 245 of the pin 240. The amount of offset or eccentric mounting of the bearings 241 can be adjusted by rotating the pin 240. The amount of offset of the axle portions 241, 243 can be set or fixed by tightening down with a set screw 247 which is threaded into a hole in the carrier member 248. The axle portions 241, 243 are set so that the rollers 228, 230 are each forced against a counterclockwise surface 245, 247 of the slots 212, 216 respectively. The rollers 232, 234 are rotatably carried on the second pin 243. By eccentrically mounting the axle portions 241, 243 and forcing the rollers 228, 230 against the counter-clockwise surfaces 245, 247 of the slots 212, 216, a force in a counter-clockwise direction as seen in FIG. 12 is applied to the lower portion 154. In this manner, the lower portion 154 is forced in a counter-clockwise direction so that clockwise surfaces 255, 257 of the slots 210, 214 respectively are forced against the rollers 234, 232. Such positioning of the rollers 228–234 is for the purpose of preventing lash or free play between the rollers 228–234 and the lower portion 154 whenever rotation is to be transmitted in either rotative direction by the rod member 148.

The lower portion 154 of the rod member 148 has a hollow interior extending through its entire length. A lower end 250 has a threaded interior 252 into which a plug 254 can be threaded a desired amount. A spring guide rod 256 extends upwardly from the plug 254. A spring 258 is received about the rod 256 and has a lower end in contact with the plug 254 and an upper end in contact with the carrier member 248. The spring 258 thus provides an upward biasing force upon the carrier member 248 and the rollers 228–238 carried thereby. The amount of bias supplied by the spring 258 can be adjusted by changing the position of the plug 254. The rollers 236, 238 are thus biased into the detent areas 222 of the camming slots 218, 220.

If the force required to rotate the gear sector 150 does not exceed a predetermined level, the biasing force of the spring 258 keeps the rollers 236, 238 within the detent areas 222. In this manner, the upper and lower portions 156, 154 rotate in unison. However, if the force required to rotate the gear sector 150 becomes excessive and exceeds the predetermined level, the rollers 236, 238 tend to roll down the camming surfaces 224, 226 to thereby force the carrier member 248 and all the rollers 228, 238 downwardly within their respective slots. In such a condition, rotary motion of the lower portion 154 is not transferred into rotary motion of the upper portion 156. Rather, the two portions 156, 154 rotate relative to one another about the bearing members 204, 206 and the rollers 228-238 move upwardly and downwardly within their respective slots.

When such an excessive load condition is present, it is desirable that the condition be noted by an operator. To accomplish this, a microswitch 261 is attached to the top member 34. A right angled actuator arm 263 is supported about a pivot pin 265 and has a first end 267 in contact with a screw 269 which is threaded into an upper end of the carrier member 248. A second end 271 of the actuator arm 263 is adapted to actuate a contact switch 275 of the microswitch 261. The screw 269 can be adjusted to place the second end 271 of the actuator arm 263 in contact with the contact switch 275 when the carrier member 248 is in it uppermost disposition. Should excessive force be applied to the sector gear 150 to thereby force the carrier member 248 downwardly against the bias of spring 258, the carrier member 248 would move downwardly and the second end 271 of the actuator arm 263 would pivot out of contact with the contactor switch 275 to actuate the microswitch 261. The microswitch 261 is adapted to be connected to an external electronic indicator, not shown, which would indicate such an overload condition to an operator.

A second coupling means 28 is used to couple the cam 18 to the support tube 86 to cause inward and outward motion of the support tube in a direction transverse to the major face of the cam 18. The coupling means 28 includes a slide assembly 260 and a flexible member, such as flexible tape 262. The flexible tape 262 has a first end 264 affixed to a lower end of the support tube 86 by a retainer 266. A second end 268 of the tape 266 is attached to a bracket 270 which in turn is attached to the top member 34. The bracket 270 also supports the slide assembly 260. A roller 259 is rotatably attached to a lower ear of the bracket 270 by means of a pin 272. A movable roller 274 is attached by means of a pin 276 to the slide assembly 260. The slide assembly 260 is movable in a linear direction to the left and right as seen in FIG. 5. After attachment to the lower end of the support tube 86 the tape 262 passes around the roller 259, then around the movable roller 274, and then to its attachment point to the bracket 270.

A cam follower attachment plate 278 is attached to the bottom of the slide assembly 260 and extends downwardly therefrom. A cam follower arm 280 is attached to the lower end of the attachment plate 278 and extends radially inward toward the cam 18 on a horizontal level therewith. A roller 282 is attached to a distal end of the cam follower arm 280 to contact the profile of the cam 18. When the apparatus 10 is supported in a general horizontal disposition, the weight of the support tube 86 and the parts carried thereon push the support tube 86 downwardly and, through the tape 262, pull the slide assembly 260 to the left in FIG. 5. The slide assembly 260 is shown in its extreme left position in FIG. 5. If the apparatus 10 is to be used in a non-horizontal disposition, a means is provided for biasing the support tube 86 toward the cams 16-22. A lower bracket 284 is attached to the rotatable outer portion 100 of the support tube 86 and an upper bracket 286 is attached to the rotatable inner portion 102. A pair of springs 290 bias the outer portion 102 and the lower non-rotatable portion 88 of the support tube 86 downwardly or inwardly toward the cams 16-22. To move the support tube 86 upwardly, the cam 18 is rotated and its profile forces the cam follower arm 280 and the attached slide assembly 260 to the right in FIG. 5. The roller 274 thus pulls on the tape 262 and shortens the effective distance of the tape between its first and second ends 264, 268. The support tube 86 is thus moved upwardly. The slide assembly 260 will be discussed in greater detail hereinafter.

A second embodiment of the coupling mechanism 28, designated generally as 28', is illustrated in FIGS. 16 and 17. Portions of the apparatus 10 which are shown in FIGS. 16 and 17 that are similar to like parts of the first embodiment will be indicated as like primed numerals. In the coupling mechanism 28', a rack and pinion mechanism, designated generally as 292, is utilized in place of the tape and roller mechanism of the coupling means 28. The rack and pinion mechanism 292 includes a first rack 294, a pinion 296, and a second rack 298. The first rack 294 is generally forked shaped and has a first prong 300 and a second prong 302. A first end 295 of the first rack 294 is coupled to the slide assembly 260' by means of a pin 304. The first prong 300 extends from the first end 295 and passes to one side of the support tube 86'. The second prong 302 extends from the first end 295 and passes around an opposite second side of the support tube 86'. Each of the prongs 300, 302 have teeth which mesh with the teeth of the pinion 296. The second rack 298 is comprised of a plurality of teeth which are formed in a portion of the support tube 86'. The pinion 296 is supported by a pin 306. The teeth of the pinion 296 mesh with the teeth of the second rack 298. An alignment roller 308 is supported by a pin 310 which is attached to the bracket 270'. The alignment roller 308 is adapted to contact a surface of the support tube 286 opposite the second rack 298 to thereby hold the support tube 86' in alignment within the hollow interior of the support shaft 14'. A support roller 312 is attached by a pin 314 below the first rack 294. The pins 306, 314 are attached at one of their ends to a portion of a first bracket 330' and at their other end to a portion of a second bracket 330'. The support roller 312 provides support for the first rack 294 adjacent the second rack 298. In the coupling mechanism 28', the inward and outward motion of the slide assembly 260' causes the first rack 294 to move to the left and right as seen in FIG. 16. Such motion rotates the pinion 296, which in turn moves the support tube 86' inwardly and outwardly with respect to the cams 16-22.

The third and fourth coupling means 30, 32 can be seen in FIG. 4. The third and fourth coupling means 30, 32 are alike. Hence, only the coupling means 30 will be discussed in detail. Like parts of the coupling means 30,32 will be indicated by like numerals.

The coupling means 30 is used to couple the cam 20 to a motion transmitting device, and the coupling means 32 is used to couple the cam 22 to another motion transmitting device. The motion transmitting devices can be rotary devices, clamping devices or linear motion devices. In an embodiment discussed more fully hereinafter, the motion transmitting devices transmit linear motion.

The coupling means 30 includes a flexible member, such as flexible tape 320, and a slide assembly 322. The slide assembly 322 is the same as the slide assembly 260 and will be described more fully hereinafter. The flexible tape 320 has a first end 324 which is fixed to a lower end of the support tube 86 by a retainer 326. A second end 328 of the tape 320 is attached to a motion transmitting device. See FIGS. 29, 30.

A support bracket 330 is attached to the top member 34. The slide assembly 322 is slidably supported by the bracket 330. A cam follower attachment plate 331 is attached to the slide assembly 322 for motion therewith. A cam follower arm 333 is attached to a lower end of the plate 331. A roller 335 is rotatably attached to a distal end of the arm 333 and is adapted to be placed in contact with and to follow the profile of the cam 20. A lower guide roller 332 is rotatably supported on a lower ear of the bracket 330 by a pin 334. An upper guide roller 336 is also supported on the bracket 330 by a pin 338. A movable roller 340 is attached to the slide assembly 332 by a pin 342 for motion therewith. The tape 320 passes upwardly from its first end 324 and passes around the lower guide roller 332. Thereafter, the tape 320 passes around the movable roller 340, around the upper guide roller 336, and upwardly to its point of attachment to a motion transmitting device at its second end 328.

The slide attachment 322 of the coupling means 30 is slidable inward and outwardly in the direction of arrow 344. By moving the slide assembly 322 inwardly and outwardly, the effective distance between the first end 324 and the second end 328 of the tape 320 is changed. This change in the effective length or distance causes motion in a motion transmitting device. The tape 320 is kept taut so that a bias on the roller 340 of the coupling means 330 is kept to the right as seen in FIG. 4 and so that the roller 335 is kept in contact with the profile of the cam 20. The biasing or tensioning means can be incorporated into the motion transmitting device.

Referring to FIGS. 29-34, there is shown an example of two motion transmitting devices 346, 348. The motion transmitting devices 346, 348 are supported on top of the support tube 86 by a surrounding housing 350. The housing 350 is attached to a top end of the inner portion 102. The motion transmitting device 346 includes a rod or arm 352 which is supported for linear reciprocal movement by the housing 350. The arm 352 is connected by a clamp 351 to the second end 328 of the tape 320 which is connected to the coupling means 30. The rod 352 is carried for reciprocal motion in the housing 350 by a pair of bearing members 354. The arm or rod 352 has a generally hollow interior with a plug 356 attached to a fixed position within the hollow interior. A spring support rod 358 is attached to the housing 350 by a nut and bolt 353 and extends into the hollow interior of the arm 352. A compression spring 360 is supported around the rod 358. A first end of the spring 360 contacts an end of the housing 350 and a second end of the spring 360 contacts the plug 356. In this manner, the spring 350 provides a biasing force to the left as seen in FIGS. 29 and 30. This bias force, places the roller 340 of the coupling means 30 under tension.

The motion transmitting device 348 includes a rod or arm 362 which is supported for reciprocal linear motion in the housing 350 by bearing members 364. The second end 328 of one of the tapes 320 is attached by means of a clamp 371 to the arm 360. The arm 362 has a hollow interior with a mounting pin 366 attached within the hollow interior adjacent to one of the ends of the arm 362. A retainer or clip 370 is attached to the housing 350 in alignment with the arm 362. One end of a tensioning spring 368 is attached to the mounting pin 366 and the other end of the spring 368 is attached to the retainer or clip 370. The spring 368 pulls the rod 362 to the right as seen in FIGS. 29 and 30. In this manner, the tape 320 which is connected to the coupling means 32 is kept under tension and the associated roller 340 is kept in contact with the profile of cam 22.

As best seen in FIG. 3, each tape 320 passes over a guide roller 372 prior to having its second end 328 attached to one of the rods 352, 362. The guide rollers 372 are rotatably carried on pins 373 which are attached to a portion of the housing 350. As is best seen in FIG. 34 each bearing member 354, 364 has a key raceway 374. The key raceway 374 disposes its associated ball bearings radially inward a distance further than the remaining ball bearing raceways. The ball bearings of the key raceway 374 are received in a groove 376 which is formed in each of the arms 352, 362. This keying of the ball bearings in the groove 376 prevents the arms 352, 362 from rotating.

The slide assembly 322 of the coupling means 30 and 32 are similar in construction to the slide assembly 260 of the coupling means 28. A force limiting means is provided for uncoupling each coupling means 28, 30 and 32 from an associated motion transmitting device if excessing force is transmitted from a motion transmitting device through a tape 262 or 320. The force limiting means used in each of the coupling means 28-32 is the same. Hence, only one of the force limiting means will be discussed in detail with the details of the slide assembly 260. Like numerals will be used to indicate like parts in all slide assemblies 260, 322 and the associated force limiting means.

Figure 21:
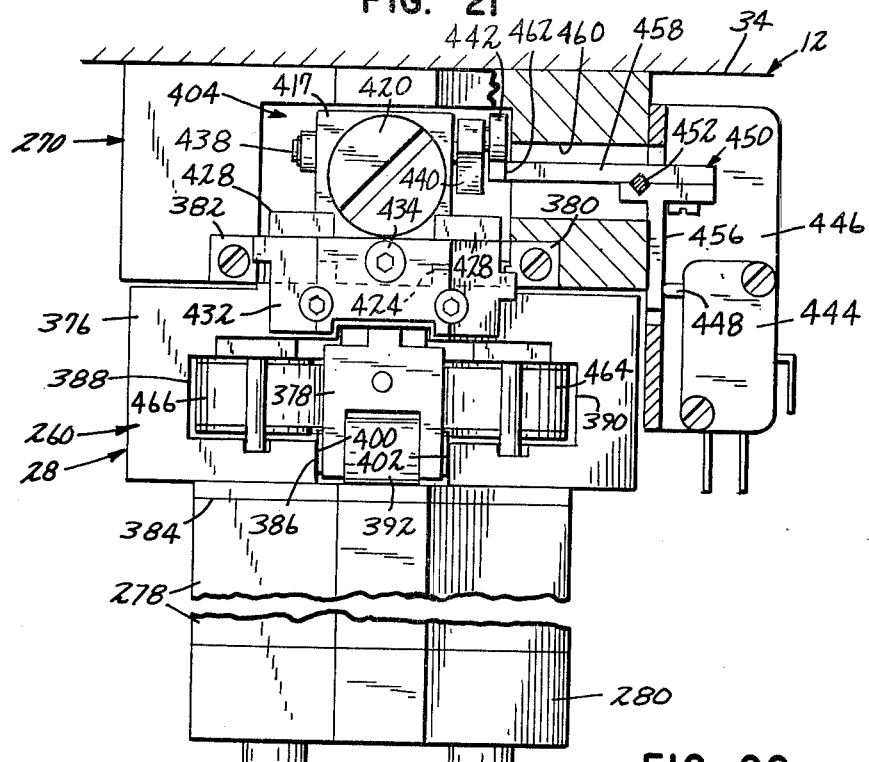
FIG. 21 is an end view, partially in section, taken generally along line 21—21 of FIG. 18.
Figure 22:
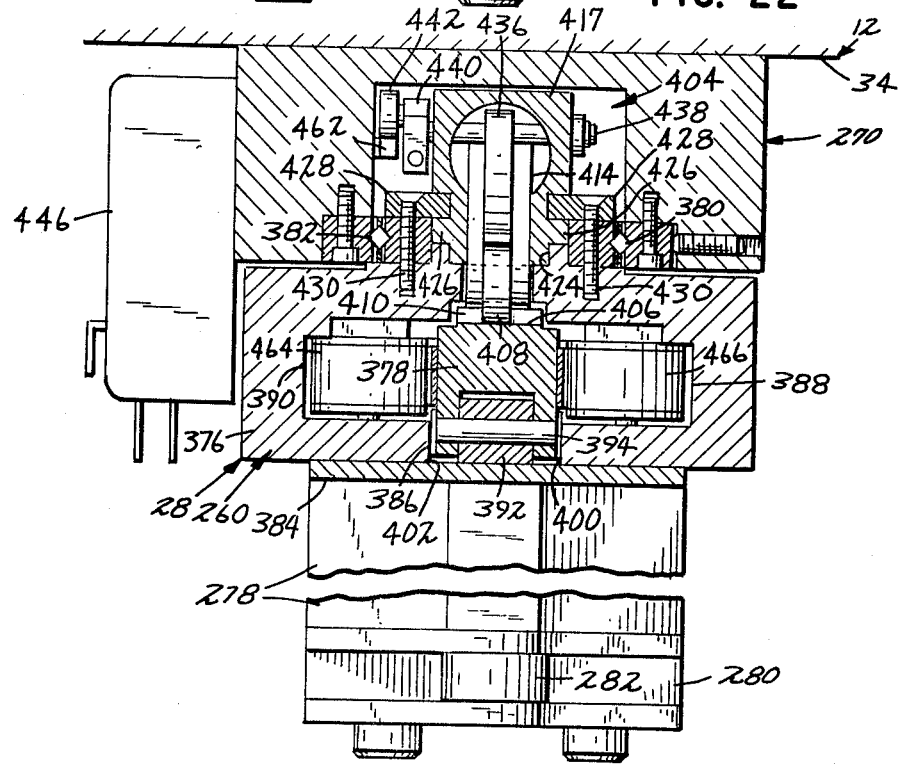
FIG. 22 is a sectional view taken generally along line 22—22 of FIG. 18.
Figure 23:
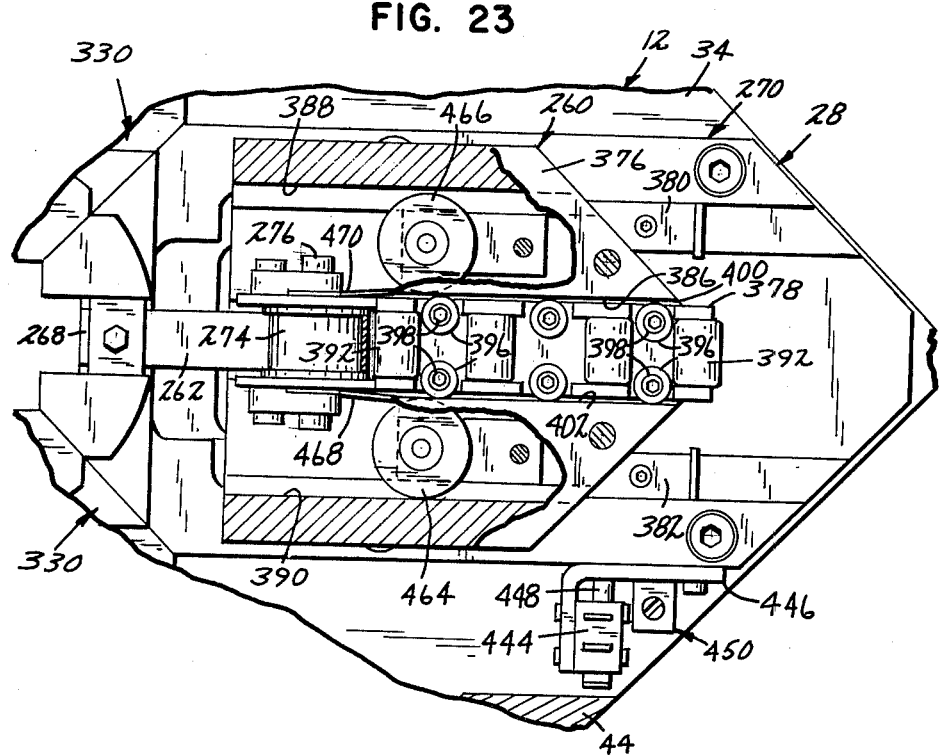
FIG. 23 is a sectional view taken generally along line 23—23 of FIG. 18.
Figure 24:
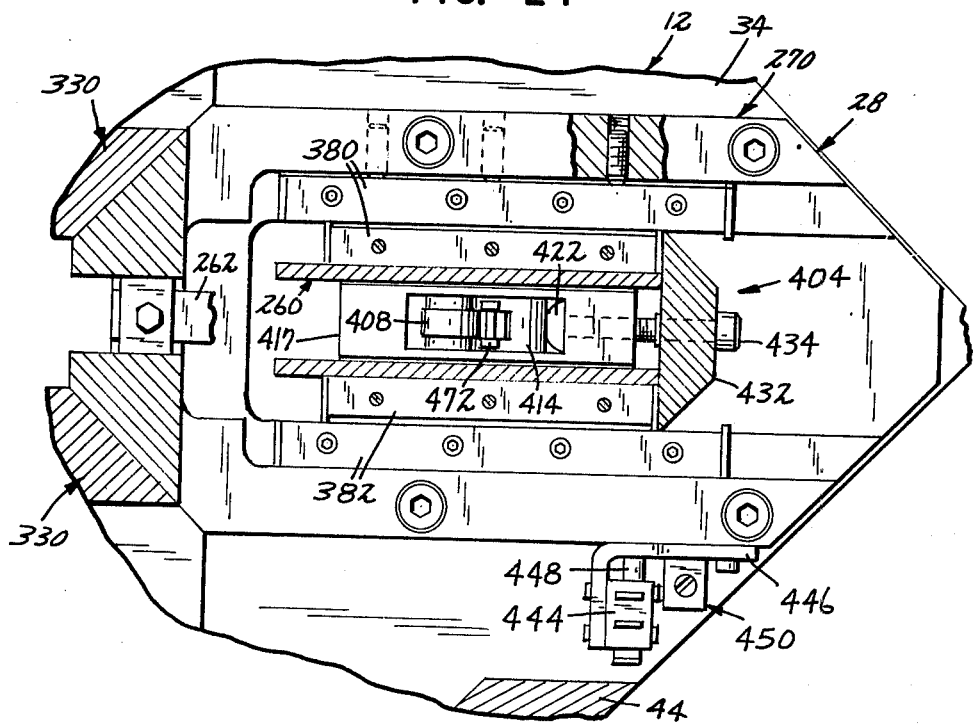
FIG. 24 is a sectional view taken generally along line 24—24 of FIG. 18.

Details of the slide assembly 260 and the associated force limiting means are best seen in FIGS. 18-28. The slide assembly 260 is slidably supported relative to the frame 12 by a bracket 270. The slide assembly includes a first main slide 376 and a secondary sub-slide 378. Linear bearings 380, 382 connect the first slide 376 to the bracket 270 for linear motion. A base plate 384 is attached to the bottom of the first slide 376. A central groove 386 is formed along the center of the first slide along its bottom surface. A pair of opposing side grooves 388, 390 are also formed in the first slide 376 on either side of the central groove 386 at a distance above the bottom surface of the first slide 376. A plurality of first rollers 392 are rotatably supported on horizontally extending pins 394. The pins 394 are attached to the secondary slide 378. The first rollers 392 are received within the central groove 386 and roll upon a top surface of the base plate 384. A plurality of second rollers 396 are supported on vertically extending pins 398 which are also attached to the secondary slide 378. As is best seen in FIG. 23, a plurality of the second rollers 396 are disposed in the central groove 386. Three of the second rollers 396 are placed in rolling contact with a first side wall 400 of the central groove 386 and three other second rollers 396 are placed in rolling contact with a second side wall 402 of the central groove 386.

A connecting device, designated generally as 404 serves to connect the first slide 376 of the second slide 378 for motion as a unitary slide assembly. The connecting device 404, also serves as a force limiting device, wherein the first slide 376 is free to move relative to the second slide 378 by means of the rollers 392, 396 when excessive force is applied to the tape 262.

The connecting device includes a detent 406 which is formed as a rectangular cutout in the second slide 378, and a roller 408. The detent has a first stop 410 at one of its ends and a second stop 412 at an opposite end. See FIG. 20. The roller 408 is rotatably carried on a pin 409 attached to a support arm or finger 414. The support arm 414 is carried for a pivotable motion by a pivot pin 416. The pivot 416 is attached to a housing 417. The housing 417 is attached to the first slide 376 for motion therewith. As seen in FIG. 22, the housing 417 fits within an upper central groove 424 in the first slide 376. The housing 417 has a pair of projecting ears 426 which are retained against the first slide 376 by means of a pair of clamp bars 428. Screws 430 hold the clamp bars 428 down upon the ears 426 and a portion of the bearing members 380, 382.

Figure 18:
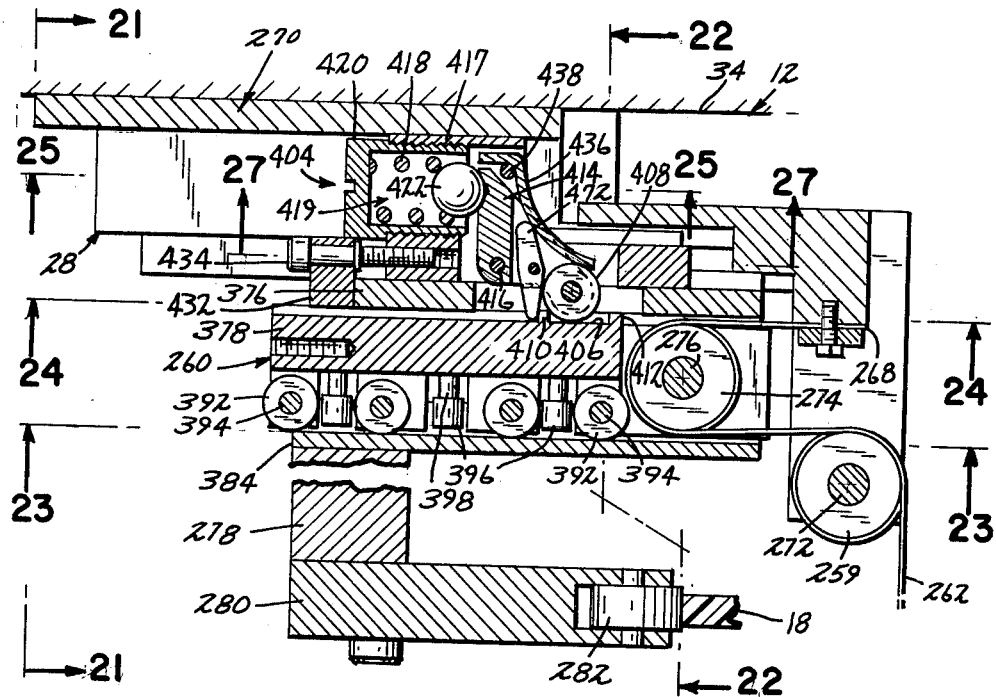
FIG. 18 is a sectional view taken generally along line 18—18 of FIG. 8.

A biasing means, designated generally as 419, provides a biasing force for pivoting the support arm 414 in a clockwise direction as seen in FIG. 18 about the pivot pin 416. The biasing means 419 includes a spring 418 received within the hollow interior of a cup or retainer 420. The cup 420 has a threaded exterior which threaded into a threaded hole in the housing 417. A first end of the spring 418 is placed in contact with a closed end of the cup 420 and a second end contacts a ball 422. The ball 422 contacts a detent in the pivot arm 414 adjacent its upper end. In this manner, the clockwise biasing force on the support arm 414 is provided. The amount of biasing force provided by the means 419 can be adjusted either by changing the spring 418 and/or by changing the position of the cup 420 by threading it inwardly or outwardly with respect to the housing 417.

An end plate 432 is attached to an end face of the first slide 376. See FIGS. 18 and 21. An adjustment screw 434 passes through a hole in the end plate 432 and threads into a hole formed in the housing 417. The original set up position of the housing 417 with respect to the first slide 376 can thereby be adjusted by the screw 434.

Figure 19:
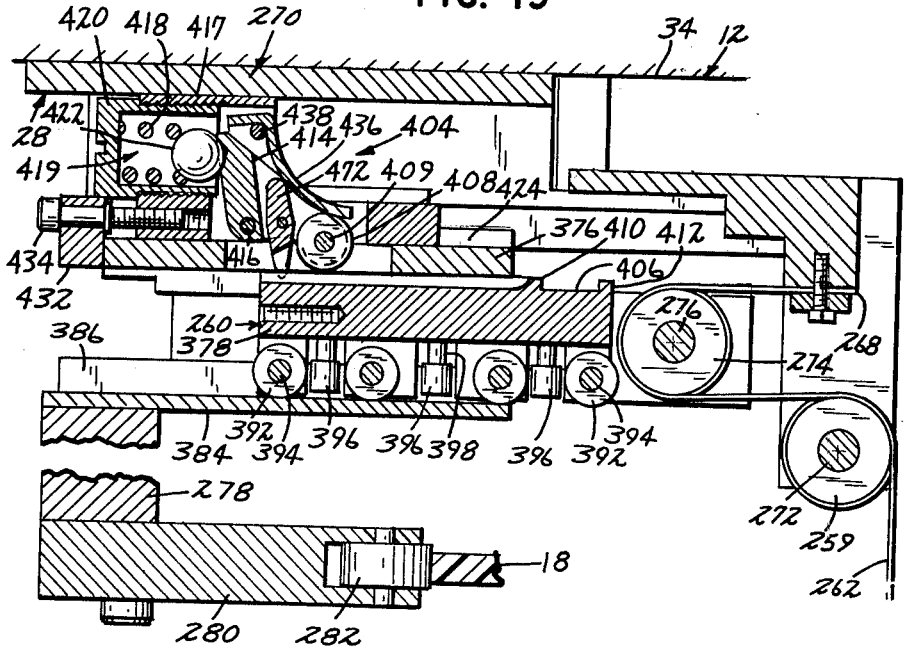
FIG. 19 is a sectional view similar to FIG. 18 illustrating a coupling mechanism in a disengaged position.

The connecting device 404 serves as a force limiting means in the hollowing matter. In normal operation, the motion of the cam 18 is transferred as linear motion of the first slide 376 through the cam follower arm 280. If there are no excessive forces on the tape 262, the biasing force provided by the biasing means 419 is sufficient to keep the roller 408 in the detent 406. The second slide 378 thus moves in unison with the first slide 376. If for some reason a jam or breakdown occurs in the motion transmitting device, for example the support tube is blocked so that it may not move upwardly, the force on the tape 262 exceeds a predetermined level. Under this condition, the roller 408 leaves the detent 406. The roller 408 moves to a position as shown in FIG. 19. As shown therein, the second slide 378 has moved relative to the first slide 376. Thereafter, any back and forth linear motion of the first slide 376 which is caused by the profile of the cam 18 acting on the cam follower arm 280 will not be transmitted to the second slide 378 since the roller 408 is not received within the detent 406.

An electrical indicating mechanism is provided to indicate to an operator when such an overload condition has occurred. A sensor arm 436 is attached to a pivot pin 438 for rotary motion about the axis of the pin 438. The pivot pin 438 is supported by the housing 417. An arm 440 is attached to an end of the pin 438 for rotary motion therewith. See FIG. 25. A roller 442 is attached to a distal end of the arm 440. A microswitch 444 is attached to a mounting plate 446. The mounting plate 446 is in turn attached to the bracket 270. The microswitch 444 includes a contact switch 448 to activate and deactivate the microswitch 444. An actuator 450 is attached for pivotable motion about a pivot pin 452. The pivot pin 452 is supported within a slot 454 in the bracket 270. The actuator 450 includes a first T-shaped member 456 and a second T-shaped member 458. The first T-shaped member 456 extends from the bottom of the pivot pin 452 and is adapted to contact the contact switch 448. See FIG. 21. The second T-shaped member 458 is attached to the top of the pivot pin 452 and extends through a slot 460 in the bracket 470 inwardly toward the arm and roller 440, 442. As seen in FIG. 25, the T-shaped member 458 includes a cross bar 462 which extends generally along the lengthwise dimension of the bracket 270. The roller 444 is disposed to roll above and contact the top surface of the cross bar 462. See FIG. 21. When the pivot pin 438 and the sensor arm 436 are in the position indicated in FIG. 18, i.e. no excessive force is presented to the slide assembly 260, the actuator 450 is in the position shown in FIG. 21 and the first T-shaped member 456 is in contact with the contact switch 448. When the force upon the tape 262 goes above a predetermined level and the roller 408 leaves the detent 406 and engages the sensor arm 436, the sensor arm 436 and the attached pivot pin 438 pivot counterclockwise as seen in FIG. 19. In this condition, the roller 442 which is attached to the arm 440 moves downwardly and lowers the cross bar 462. This pivots the actuator 450 counter-clockwise as shown in FIG. 21 to thereby depress the contact switch 448 with the T-shaped member 456. In such a condition, the microswitch 444 is activated and in turn activates an electronic indicator, not shown, which can be sensed by an operator. An indication of the overload condition is thus provided.

Figure 20:
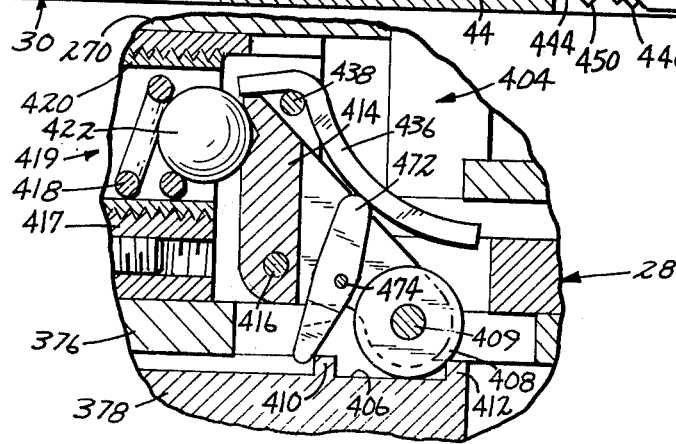
FIG. 20 is a fragmentary sectional view similar to a portion of FIG. 18 illustrating a different position of parts of a coupling mechanism on an enlarged scale.

The connecting device 404, in conjunction with the microswitch 444, can also provide an indication that the tape 262 is no longer under tension. Such a condition could occur if the tape 262 should break. Such a condition is shown in FIG. 20. A first spring 464 is mounted in the groove 390 of the first slide 376 and a second slide 466 is mounted in the groove 388 in the first slide 376. Each of the springs 464, 466 is a coil type spring having a first rolled up end and second end 468, 470 respectively. Each second end 468, 470 of the springs 464, 466 is attached to the second slide 378. The springs 464, 466 thus bias the second slide 378 to the right as seen in FIG. 23 with respect to the first slide 376. The biasing force of the springs 464, 466 is less than the force applied by the tape 262 under ordinary operating conditions. Thus, under normal operating conditions, the roller 408 is in contact with the stop 410. However, when tension is lacking on the tape 262, the second slide 378 moves with respect to the first slide 376 and the roller 408 moves to the position shown in FIG. 20 wherein the roller 408 rests against the stop 412 of the detent 406. An actuator finger 472 is rotatably carried on a pin 474. The pin 474 is attached to the support arm 414. When the roller 408 moves to the position shown in FIG. 20, the actuator finger 472 contacts the stop 410 and rotates in a clockwise direction. The upper end of the actuator finger 472 thus contacts the sensor arm 436 to pivot the sensor arm 436 in a counterclockwise direction as seen in FIG. 20. Such rotation of the sensor arm 436 activates the microswitch 444 in the manner described above to indicate that a problem exists in the coupling means 28.

The operation of the manipulator apparatus 10 should be self evident from the preceding detailed description, hence, only a short summary of the operation follows. Input driving power is provided by the apparatus 10 by the rotary motion of the input drive shaft 24. The rotary motion of the drive shaft 24 is converted into rotary motion of the cams 16–22. The rotary motion of each cam 16–22 is thereafter converted into a plurality of independent motions through coupling means 26–32. A support tube 86 is provided for supporting motion transmitting devices 346, 348. The coupling means 26 couples the cam 16 to the support tube 86 in order to rotate an upper rotatable section 90 of the support tube 86. The rotation of the upper rotatable section 90 also rotates the motion transmitting means 346, 348. A force limiting means 158 is provided to uncouple the coupling means 26 between the cam 16 and the upper rotatable section 90 if excessive force is presented.

While the coupling means 26 is providing rotary motion to the support tube 86, the coupling means 28 provides upward and downward motion to the support tube 86. The upward and downward motion is provided by changing the effective or straight line distance between the first and second ends 264, 268 of the tape 262 by means of the motion of the slide 260. The motion of the slide 260 is accomplished through the action of the profile of the cam 18 upon the cam follower cam 280. Alternatively, the upward and downward motion can be provided by the rack and pinion mechanism 292.

The coupling means 30, 32 couple the cams 20, 22 to the motion transmitting devices 346, 348. Each coupling means 30, 38 utilizes a flexible tape 320 having a first end 324 attached to a lower end of the support tube 64 and a second end 328 attached to arms 352, 360 of the motion transmitting devices 346, 348. The inward and outward motion of the slide assemblies 322 of the coupling means 30, 32 changes the effective distance between the first and second ends 326, 328 of the tapes 320 to thereby move and arms 352, 360 inwardly and outwardly. As was discussed above, the tapes 320 can be coupled to different types of motion transmitting devices, such as clamps or rotary members.

The slide assemblies 260, 322 each have a connecting device 404 which serves as a force limiting means. If excessive force over a predetermined limit is placed upon either of the tapes 262, 320, the connecting device 404 uncouples one of the first slides 376 from a respective second slide 378 so that the action of one of the cams 18–22 is not transmitted to the tape 262, 320.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent extended by the broad general meaning of the terms in which the appended claims are expressed.

What is claimed:

1. A manipulator apparatus for perfoming a plurality of motions comprising:
   a rotatable support shaft;
   means for holding said support shaft for rotary motion about its axis;
   a plurality of discrete cams supported in a spaced relationship on said support shaft;
   individual coupling means for coupling each of said cams to a motion transmitting device, each coupling means including a cam follower for following the profile of one of said cams; and
   individual force limiting means for coupling one of said coupling means when a force beyond a predetermined level is reached in said one of said coupling means;
   wherein each of said cams is a radial cam, and at least one of said coupling means includes a slide assembly supported on said frame for motion in a direction generally transverse to the axis of said support shaft, and wherein at least one of said cam followers includes an attachment portion attached to said slide assembly and a contact portion adapted to contact the profile of one of said cams.

2. A manipulator apparatus in accordance with claim 1 wherein at least one of said coupling means includes a flexible tape having a first end fixed at a point and a second end connected to a motion transmitting device, said tape passing around a portion of said slide assembly whereby the motion of said slide assembly changes the straight line distance of said tape between its first and second ends.

3. A manipulator apparatus in accordance with claim 1 wherein each slide assembly includes a first slide and a second slide, said first and second slides being movable with respect to one another, and wherein said force limiting means includes connecting means for connecting said first slide to said second slide for motion as a unit when the force between said first and second slides of one of said coupling means is less than said predetermined level and for releasing said first and second slides from one another when the force between a pair of first and second slides exceeds said predetermined level whereby said first and second slides are free to move relative to one another and the force being transmitted from said cam to said cam follower ceases to be transmitted to a motion transmitting device.

4. A manipulator apparatus in accordance with claim 3 wherein said first slide is slidably connected by first bearing means to said frame for reciprocal linear motion, said second slide being slidably carried by second bearing means in said first slide for reciprocal linear motion in parallel with said first slide, and wherein said connecting means includes a detent formed in one of said first and second slides, a connecting member carried by the other of said first and second slides, and means for biasing a portion of said connecting member into said detent whereby said first and second slides are connected together for motion as a unit.

5. A manipulator apparatus in accordance with claim 4 wherein said connecting member is comprised of a pivotable finger having first and second ends, said finger being pivotable about an axis member passing through said finger between its first and second ends, said axis member being carried by said first slide, said first end of the finger being in contact with said biasing means, and a roller being rotatably supported on the second end of said finger whereby said biasing means pivots said finger about said axis member to bias said roller into said detent.

6. A manipulator apparatus in accordance with claim 3 wherein at least one of said coupling means includes a flexible tape having a first end fixed at a point and a second end connected to a motion transmitting device, said tape passing around a portion of said slide assembly whereby the motion of said slide assembly changes the straight line distance of said tape between its first and second ends.

7. A manipulator apparatus in accordance with claim 6 wherein the portion of said slide assembly about which said tape passes is a roller attached to said second slide, and wherein said apparatus includes a first roller means, and a roller being rotatably supported on the second end of said finger whereby said biasing means pivots said finger about said axis member to bias said roller into said detent.

50. A slide assembly in accordance with claim 49 including a means for adjusting the biasing force of said biasing means upon the first end of said finger.

51. A slide assembly in accordance with claim 50 wherein said biasing means for applying a biasing force to the first end of said finger includes a spring having a first end in contact with a wall and a second end in contact with the first end of the finger, said biasing force adjusting means including means for adjusting the position of said wall in which the first end of the spring is in contact.

52. A slide assembly in accordance with claim 51 wherein said spring is carried within the hollow interior of a cup and the first end of said spring is in contact with a bottom end of said cup, said cup having a threaded exterior which is threadedly received within threads of a retainer carried by said first slide, said biasing force adjusting means comprising the mating threaded exterior of said cup and the threaded portion of said retainer.

* * * * * said biasing means includes a compression spring received within the hollow interior of said lower portion of said rod member, said spring having a first end in contact with said carrier member and a second end in contact with a plug threaded in a lower end of said lower portion whereby said spring biases said carrier member and the first and second pins upwardly.

30. A manipulator apparatus in accordance with claim 29 wherein said second pin includes axle pins for mounting said another pair of rollers, said axle portions being excentrically disposed with respect to the remainder of said second pin.

31. A manipulator apparatus in accordance with claim 29 including a microswitch attached to said frame adjacent said rotary motion coupling means, an actuator arm being pivotably supported by said frame and having a first end in operative contact with said carrier member and a second end for activating said microswitch whereby said actuator arm activates said microswitch when said carrier member moves in response to excessive force applied to said second gear sector.

32. A manipulator apparatus in accordance with claim 17 or 18 wherein each slide assembly includes a first slide and a second slide, said first and second slides being movable with respect to one another, one of said first and second slides carrying said rotatable roller and the other of said first and second slides supporting said cam follower and wherein said force limiting means includes connecting means for connecting said first slide to said second slide for motion as a unit when the force between said first and second slides of one of said coupling means is less than said predetermined level and for releasing said first and second slides from one another when the force between a pair of first and second slides exceeds said predetermined level whereby said first and second slides are free to move relative to one another and the force being transmitted from said cam to said cam follower ceases to be transmitted to a motion transmitting device.

33. A manipulator apparatus in accordance with claim 32 wherein said first slide is slidably connected by first slide bearing means to said frame for reciprocal linear motion in relation thereto, said second slide being slidably carried by second slide bearing means in said first slide for reciprocal linear motion in parallel with said first slide, and wherein said connecting means includes a detent formed in one of said first and second slides, a connecting member carried by the other of said first and second slides, and means for biasing a portion of said connecting member into said detent whereby said first and second slides are connected together for motion as a unit.

34. A manipulator apparatus in accordance with claim 33 including means for adjusting the biasing force of said biasing means upon said connecting member.

35. A manipulator apparatus in accordance with claim 33 wherein said connecting member is comprised of a pivotable finger having first and second ends, said finger being pivotable about an axis member passing through said finger at a location between its first and second ends, said axis member being carried by said first slide, said detent being formed in said second slide, said first end of the finger being in contact with said biasing means, and a roller being rotatably supported on the second end of said finger whereby said biasing means pivots said finger about said axis member to bias said roller into said detent.

36. A manipulator apparatus in accordance with claim 35 including a means for adjusting the biasing force of said biasing means upon the first end of said finger.

37. A manipulator apparatus in accordance with claim 36 wherein said biasing means for applying a biasing force to the first end of said finger includes a spring having a first end in contact with a wall and a second end in contact with the first end of the finger, said biasing force adjusting means including means for adjusting the position of said wall in which the first end of the spring is in contact.

38. A manipulator apparatus in accordance with claim 37 wherein said spring is carried within the hollow interior of a cup and the first end of said spring is in contact with a bottom end of said cup, said cup having a threaded exterior which is threadedly received within threads of a retainer carried by said first slide, said biasing force adjusting means comprising the mating threaded exterior of said cup and the threaded portion of said retainer.

39. A manipulator apparatus in accordance with claim 37 including an electrical indicating means for indicating when said roller is disengaged from said detent, said indicating means including an actuator arm and a microswitch, and said actuator arm being rotatably carried by said first slide and having a first end in contact with the roller in said detent and a second end operatively connected to said microswitch.

40. A manipulator apparatus in accordance with claim 39 wherein said microswitch is connected to said frame and an actuator couples a contact switch of said microswitch with said actuator arm, said actuator including a member having an extended surface for contacting a portion of said actuator arm at a plurality of locations.

41. A manipulator apparatus for performing a plurality of motions comprising:
a frame;
a rotatable support shaft having a hollow interior;
means connected to said frame for holding said support shaft for rotary motion about its axis;
a single rotary input drive shaft having a drive gear supported thereon;
a driven gear fixed to said rotatable shaft and meshing with said drive gear;
a plurality of discrete radial cams supported in a spaced relationship on said support shaft;
individual coupling means for coupling each of said cams to a motion transmitting device, each coupling means including a cam follower for following the profile of one of said cams;
individual force limiting means associated with each of said coupling means for uncoupling one of said coupling means when a force beyond a predetermined level is reached in a respective one of said coupling means;
a support tube received within and extending from the hollow interior of said support shaft for supporting at least one motion transmitting device, said support tube being comprised of a lower non-rotatable section and an upper rotatable section;
said upper rotatable section including a discrete outer portion and a discrete inner portion, means for connecting said outer and inner portions together for rotation as a unit, and means for connecting a lower end of said inner portion to an upper end of said lower non-rotatable section whereby said inner portion is freely rotatable with respect to said lower non-rotatable section, and means for connecting said outer and inner portions together so that said inner portion and said lower non-rotatable section are movable in a linear direction along the axis of said support tube;

one of said coupling means forming a rotary motion coupling means for coupling one of said cams to the outer portion of the upper rotatable section of said support tube for rotating said outer portion;

another of said coupling means forming a support tube coupling means for coupling one of said cams to said support tube for moving said support tube inwardly and outwardly in a direction generally transverse to the major face of said cams;

at least one of said coupling means including a slide assembly movable inwardly and outwardly in a direction generally transverse to the axis of said support shaft, said slide assembly having a rotatable roller carried by said slide assembly for motion therewith, a flexible tape, said flexible tape having one end fixed to a point and a second end fixed to a motion transmitting device, said tape passing around said roller at a point intermediate its first and second ends, whereby the motion of said slide assembly changes the straight line distance between the first and second ends of said tape to activate said motion transmitting device coupled thereto; and each slide assembly including a first slide and a second slide, said first and second slides being movable with respect to one another, one of said first and second slides carrying said rotatable roller and the other of said first and second slides supporting said cam follower, said force limiting means including a connecting means for connecting said first slide to said second slide for motion as a unit when the force between said first and second slides of one of said coupling means is less than said predetermined level and for releasing said first and second slides from one another when the force between a pair of first and second slides exceeds said predetermined level.

42. A manipulator apparatus in accordance with claim 41 wherein said first slide is slidably connected by first slide bearing means to said frame for reciprocal linear motion in relation thereto, said second slide being slidably carried by second slide bearing means in said first slide for reciprocal linear motion in parallel with said first slide, and wherein said connecting means includes a detent formed in one of said first and second slides, a connecting member carried by the other of said first and second slides, and means for biasing a portion of said connecting member into said detent whereby said first and second slides are connected together for motion as a unit.

43. A manipulator apparatus in accordance with claim 42 wherein said connecting member is comprised of a pivotable finger having first and second ends, said finger being pivotable about an axis member passing through said finger at a location between its first and second ends, said axis member being carried by said first slide, said detent being formed in said second slide, said first end of the finger being in contact with said biasing means, and a roller being rotatably supported on the second end of said finger whereby said biasing means pivots said finger about said axis member to bias said roller to said detent, and including means for adjusting the biasing force of said biasing means upon the first end of said finger.

44. A manipulator apparatus in accordance with claim 43 wherein said biasing means for applying a biasing force to the first end of said finger includes a spring carried within the hollow interior of a cup, said spring having a first end in contact with a bottom end of said cup and a second end in contact with the first end of the finger, said biasing force adjusting means including a threaded exterior of said cup being threadedly received within threads of a retainer carried by said first side.

45. A manipulator apparatus in accordance with claim 41 or 42 wherein said rotary motion coupling means includes a first gear sector attached to said outer portion of said upper rotatable section for motion therewith, a pivotable follower arm for contacting one of said cams, a rotatable rod member, and a second gear sector for meshing with said first gear sector, said follower arm being connected to said rod member adjacent a first end thereof and said second gear sector being connected to said rod member adjacent a second end thereof, said rod member being comprised of separate upper and lower portions, and one of said force limiting means coupling said upper and lower portions of said rod member together for motion as a unit when the force on said second gear sector is below a predetermined level and for uncoupling said upper and lower portion when the force on said second gear sector exceeds a predetermined level.

46. A slide assembly for use in a manipulator apparatus comprising a first slide and a second slide, said first and second slides being movable with respect to one another, said first slide carrying coupling means for coupling said first slide to a motion transmitting device, said second slide supporting a cam follower, a force limiting means including connecting means for connecting said first slide to said second slide for motion as a unit when the force between said first and second slides is less than said predetermined level and for releasing said first and second slides from one another when the force between a pair of first and second slides exceeds said predetermined level whereby said first and second slides are free to move relative to one another and the force being transmitted from said cam to said cam follower ceases to be transmitted to a motion transmitting device.

47. A slide assembly in accordance with claim 46 wherein said second slide is slidably carried by slide bearing means in said first slide for reciprocal linear motion with respect to said first slide, and wherein said connecting means includes a detent formed in one of said first and second slides, a connecting member carried by the other of said first and second slides, and means for biasing a portion of said connecting member into said detent whereby said first and second slides are connected together for motion as a unit.

48. A slide assembly in accordance with claim 47 including means for adjusting the biasing force of said biasing means upon said connecting member.

49. A slide assembly in accordance with claim 47 wherein said connecting member is comprised of a pivotable finger having first and second ends, said finger being pivotable about an axis member passing through said finger at a location between its first and second ends, said axis member being carried by said first slide, said detent being formed in said second slide, said first end of the finger being in contact with said biasing

UNITED STATES PATENT AND TRADEMARK OFFICE
CERTIFICATE OF CORRECTION

PATENT NO. : 4,264,266
DATED : April 28, 1981
INVENTOR(S) : Hans W. Trechsel

It is certified that error appears in the above-identified patent and that said Letters Patent are hereby corrected as shown below:

Column 8, line 4 after "downwardly" insert --sloping--;

Column 8, line 33, "243" should be --242--;

Column 9, line 19, "it" should be --its--;

Column 11, line 15, "332" should be --322--;

Column 11, line 22 "attachment" should be --assembly--;

Column 11, line 47 "to" should be --at--;

Column 12, line 5, "3" should be --33--;

Column 12, line 58, "of" should be --to--;

UNITED STATES PATENT AND TRADEMARK OFFICE
CERTIFICATE OF CORRECTION

PATENT NO. : 4,264,266

DATED : April 28, 1981

INVENTOR(S) : Hans W. Trechsel

It is certified that error appears in the above-identified patent and that said Letters Patent are hereby corrected as shown below:

Column 8, line 4 after "downwardly" insert --sloping--;

Column 8, line 33, "243" should be --242--;

Column 9, line 19, "it" should be --its--;

Column 11, line 15, "332" should be --322--;

Column 11, line 22 "attachment" should be --assembly--;

Column 11, line 47 "to" should be --at--;

Column 12, line 5, "3" should be --33--;

Column 12, line 58, "of" should be --to--;

UNITED STATES PATENT AND TRADEMARK OFFICE
CERTIFICATE OF CORRECTION

PATENT NO. : 4,264,266
DATED : April 28, 1981
INVENTOR(S) : Hans W. Trechsel

It is certified that error appears in the above-identified patent and that said Letters Patent are hereby corrected as shown below:

Column 13, line 18, "threaded", first occurrence, should be -- threads --.

Column 13, line 36, "hollowing" should be --following--;

Column 14, line 7, "470" should be --270--;

Column 14, line 37, "second slide" should be --second spring--;

Column 14, line 66, "by" should be --to--;

Column 15, line 21, "cam 280" should be --arm 280--;

UNITED STATES PATENT AND TRADEMARK OFFICE
CERTIFICATE OF CORRECTION

PATENT NO. : 4,264,266

DATED : April 28, 1981

INVENTOR(S) : Hans W. Trechsel

It is certified that error appears in the above-identified patent and that said Letters Patent are hereby corrected as shown below:

Column 15, line 33, "and", first occurrence should be -- the --.

Claim 1, line 67, "coupling" should be --uncoupling--;

Claim 12, line 53, after "side of" insert --said--;

Claim 12, line 57 "is" should be --said--;

Claim 13, line 59, "of of" should be --of--;

Claim 13, line 62, "is" should be --its--;

Claim 16, line 33, "is" should be --its--;

Claim 27, line 24, "following" should be --follower--

Signed and Sealed this

Fifteenth Day of September 1981

[SEAL]

Attest:

GERALD J. MOSSINGHOFF

Attesting Officer

Commissioner of Patents and Trademarks